US012624277B2

(12) United States Patent
Walker et al.

(10) Patent No.: US 12,624,277 B2
(45) **Date of Patent: *May 12, 2026**

(54) INJECTION FLUIDS FOR STIMULATING FRACTURED FORMATIONS

(71) Applicant: CHEVRON U.S.A. INC., San Ramon, CA (US)

(72) Inventors: Dustin L. Walker, Dallas, TX (US); Gayani W. Pinnawala, Houston, TX (US); Nabijan Nizamidin, Emeryville, CA (US); Varadarajan Dwarakanath, Houston, TX (US); Guo-Qing Tang, Mountain View, CA (US); Dustin J. Lowry, Pinole, CA (US); Tetsuo A. Inouye, Sebastopol, CA (US); Taimur Malik, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/496,558

(22) Filed: Oct. 27, 2023

(65) Prior Publication Data

US 2024/0327698 A1 Oct. 3, 2024

Related U.S. Application Data

(63) Continuation of application No. 16/635,906, filed as application No. PCT/US2018/044716 on Jul. 31, 2018, now Pat. No. 11,834,609.

(Continued)

(51) Int. Cl.

| | |
|---|---|
| ***C09K 8/60*** | (2006.01) |
| ***C09K 8/68*** | (2006.01) |

(Continued)

(52) U.S. Cl.

CPC .............. *C09K 8/604* (2013.01); *C09K 8/602* (2013.01); *C09K 8/68* (2013.01); *C09K 8/74* (2013.01);

(Continued)

(58) Field of Classification Search

CPC .......... C09K 8/604; C09K 8/602; C09K 8/68; C09K 8/74; C09K 8/80; C09K 8/86;

(Continued)

(56) References Cited

U.S. PATENT DOCUMENTS

| | | |
|---|---|---|
| 3,179,173 A | 4/1965 | Jones, Jr. et al. |
| 3,227,210 A | 1/1966 | Trantham |

(Continued)

FOREIGN PATENT DOCUMENTS

| | | |
|---|---|---|
| CN | 103320103 A | 9/2013 |
| CN | 106634935 A | 5/2017 |

(Continued)

OTHER PUBLICATIONS

Adkins, Stephanie et al., “Development of Thermally and Chemically Stable Large-Hydrophobe Alkoxy Carboxylate Surfactants”, SPE Improved Oil Recovery Symposium, Apr. 14-18, 2012, Tulsa, Oklahoma, USA, vol. SPE 154256, pp. 14-18, XP055513463, USA DOI: 10.2118/154256-MS ISBN: 978-1-61399-197-8 p. 1-6.

(Continued)

*Primary Examiner* — Alicia Bland

(74) *Attorney, Agent, or Firm* — Meunier Carlin & Curfman LLC

(57) ABSTRACT

Embodiments of the disclosure include compositions and methods that stabilize a injection fluid when exposed to reservoir conditions, reducing formation damage and increasing the amount of hydrocarbon recovered. Specifically, the formulation is a single-phase liquid surfactant package which comprises a surfactant and optionally one or (Continued)

more secondary surfactants. Also provided are methods of using the stabilized injection fluids in stimulation operations.

20 Claims, 10 Drawing Sheets

Related U.S. Application Data

(60) Provisional application No. 62/538,883, filed on Jul. 31, 2017.

(51) Int. Cl.

| | |
|---|---|
| ***C09K 8/74*** | (2006.01) |
| ***C09K 8/80*** | (2006.01) |
| ***C09K 8/86*** | (2006.01) |
| ***E21B 43/267*** | (2006.01) |
| ***E21B 43/27*** | (2006.01) |
| ***E21B 47/11*** | (2012.01) |

(52) U.S. Cl.
CPC .................. *C09K 8/80* (2013.01); *C09K 8/86* (2013.01); *E21B 43/267* (2013.01); *E21B 43/27* (2020.05); *E21B 47/11* (2020.05); *C09K 2208/10* (2013.01); *C09K 2208/12* (2013.01); *C09K 2208/26* (2013.01); *C09K 2208/28* (2013.01); *C09K 2208/32* (2013.01)

(58) Field of Classification Search
CPC ............ C09K 2208/10; C09K 2208/12; C09K 2208/26; C09K 2208/28; C09K 2208/32; C09K 8/845; E21B 43/267; E21B 43/27; E21B 47/11
See application file for complete search history.

(56) References Cited

U.S. PATENT DOCUMENTS

| | | | | |
|---|---|---|---|---|
| 3,580,337 | A | 5/1971 | Gogarty et al. | |
| 3,811,504 | A | 5/1974 | Haferkamp et al. | |
| 3,811,505 | A | 5/1974 | Flournoy et al. | |
| 3,811,507 | A | 5/1974 | Flournoy et al. | |
| 3,827,499 | A | 8/1974 | Norton et al. | |
| 3,890,239 | A | 6/1975 | Dycus et al. | |
| 4,016,932 | A | 4/1977 | Kalfoglou | |
| 4,018,278 | A | 4/1977 | Shupe | |
| 4,077,471 | A | 3/1978 | Shupe et al. | |
| 4,088,189 | A | 5/1978 | Shupe | |
| 4,110,229 | A | 8/1978 | Carlin et al. | |
| 4,138,345 | A | 2/1979 | Williams | |
| 4,194,565 | A | 3/1980 | Kalfoglou | |
| 4,269,271 | A | 5/1981 | Shupe et al. | |
| 4,340,492 | A | 7/1982 | Stournas | |
| 4,391,719 | A | 7/1983 | Meister | |
| 4,463,806 | A | 8/1984 | Hurd | |
| 4,532,051 | A * | 7/1985 | Nuckels nee Byth | C09K 23/017 166/275 |
| 5,143,156 | A | 9/1992 | Bromley | |
| 5,203,411 | A | 4/1993 | Dawe et al. | |
| 5,250,185 | A | 10/1993 | Tao et al. | |
| 5,488,148 | A | 1/1996 | Weerasooriya et al. | |
| 5,638,902 | A | 6/1997 | Martin | |
| 6,022,843 | A | 2/2000 | Shanks et al. | |
| 6,196,314 | B1 | 3/2001 | Chen | |
| 6,225,267 | B1 | 5/2001 | Eckard et al. | |
| 7,629,299 | B2 | 12/2009 | Berger et al. | |
| 7,770,641 | B2 | 8/2010 | Dwarakanath et al. | |
| 8,146,666 | B2 | 4/2012 | Tang | |
| 8,211,837 | B2 | 7/2012 | Weerasooriya et al. | |
| 8,789,594 | B2 | 7/2014 | Curole et al. | |
| 8,794,320 | B2 | 8/2014 | Ayirala et al. | |
| 9,422,469 | B2 | 8/2016 | Dwarakanath et al. | |
| 9,605,198 | B2 | 3/2017 | Shong et al. | |
| 9,617,464 | B2 | 4/2017 | Dwarakanath et al. | |
| 9,840,898 | B2 | 12/2017 | Kasevich et al. | |
| 9,890,627 | B2 | 2/2018 | Kasevich et al. | |
| 9,896,617 | B2 | 2/2018 | Dwarakanath et al. | |
| 9,902,894 | B2 | 2/2018 | Dwarakanath et al. | |
| 9,902,895 | B2 | 2/2018 | Dwarakanath et al. | |
| 9,909,053 | B2 | 3/2018 | Dwarakanath et al. | |
| 9,914,872 | B2 | 3/2018 | Wehunt et al. | |
| 9,976,072 | B2 | 5/2018 | Shong et al. | |
| 10,197,489 | B2 | 2/2019 | Mccarty et al. | |
| 10,677,706 | B2 | 6/2020 | Mccarty et al. | |
| 10,717,921 | B2 | 7/2020 | Frattarelli | |
| 11,753,582 | B2 * | 9/2023 | Walker | E21B 43/27 166/280.1 |
| 11,834,609 | B2 * | 12/2023 | Walker | E21B 47/11 |
| 2003/0188864 | A1 * | 10/2003 | Boudreau | C09K 8/74 166/270.1 |
| 2005/0199395 | A1 | 9/2005 | Berger et al. | |
| 2006/0185845 | A1 | 8/2006 | Shpakoff et al. | |
| 2006/0189486 | A1 | 8/2006 | Shpakoff et al. | |
| 2007/0116524 | A1 | 5/2007 | Shiau | |
| 2007/0191633 | A1 | 8/2007 | Berger et al. | |
| 2008/0064614 | A1 | 3/2008 | Ahrenst et al. | |
| 2009/0023616 | A1 | 1/2009 | Couillet et al. | |
| 2009/0044945 | A1 | 2/2009 | Willberg et al. | |
| 2009/0112014 | A1 | 4/2009 | Campbell et al. | |
| 2009/0270281 | A1 | 10/2009 | Steinbrenner et al. | |
| 2010/0004843 | A1 | 1/2010 | Yu et al. | |
| 2010/0292110 | A1 | 11/2010 | Pope et al. | |
| 2010/0319920 | A1 | 12/2010 | Pope et al. | |
| 2011/0035154 | A1 | 2/2011 | Kendall et al. | |
| 2011/0046024 | A1 | 2/2011 | Campbell et al. | |
| 2011/0048721 | A1 | 3/2011 | Pope et al. | |
| 2011/0059872 | A1 | 3/2011 | Weerasooriya et al. | |
| 2011/0059873 | A1 | 3/2011 | Weerasooriya et al. | |
| 2011/0071057 | A1 | 3/2011 | Weerasooriya et al. | |
| 2011/0098492 | A1 | 4/2011 | Varineau et al. | |
| 2011/0100402 | A1 | 5/2011 | Soane et al. | |
| 2011/0148721 | A1 | 6/2011 | Mengoni | |
| 2011/0190174 | A1 | 8/2011 | Weerasooriya et al. | |
| 2011/0190175 | A1 | 8/2011 | Steinbrenner et al. | |
| 2011/0201531 | A1 | 8/2011 | Sharma et al. | |
| 2011/0281779 | A1 * | 11/2011 | Weerasooriya | C08G 65/2609 562/110 |
| 2014/0083693 | A1 * | 3/2014 | Frank | E21B 43/20 166/270 |
| 2014/0288909 | A1 | 9/2014 | Prestwood et al. | |
| 2015/0083420 | A1 | 3/2015 | Gupta et al. | |
| 2016/0068742 | A1 | 3/2016 | Oxide et al. | |
| 2016/0281494 | A1 | 9/2016 | Shirdel et al. | |
| 2017/0145292 | A1 | 5/2017 | Szalai et al. | |
| 2017/0198202 | A1 | 7/2017 | Shong et al. | |
| 2017/0321111 | A1 | 11/2017 | Velez et al. | |
| 2018/0037809 | A1 | 2/2018 | Frattarelli et al. | |
| 2018/0202273 | A1 | 7/2018 | Kasevich et al. | |

FOREIGN PATENT DOCUMENTS

| | | | |
|---|---|---|---|
| EP | 0032072 | A1 | 7/1981 |
| WO | 2006008439 | A1 | 1/2006 |
| WO | 2008079855 | A2 | 7/2008 |
| WO | 2011094442 | A1 | 8/2011 |
| WO | 2012027757 | A1 | 3/2012 |
| WO | 2018075237 | A1 | 4/2018 |
| WO | 2019005289 | A1 | 1/2019 |
| WO | 2019028083 | A1 | 2/2019 |
| WO | 2019028085 | A1 | 2/2019 |
| WO | 2019028086 | A1 | 2/2019 |

OTHER PUBLICATIONS

Al Yousef, Zuhair A., Mohammed A. Almobarky, and David S. Schechter. "Surfactant and a mixture of surfactant and nanoparticles to stabilize CO 2/brine foam, control gas mobility, and enhance oil recovery." Journal of Petroleum Exploration and Production Technology 10 (2020): 439-445. CMTC-486622-MS.

(56) References Cited

OTHER PUBLICATIONS

Almobarky, Mohammed A., Zuhair AlYousef, and David Schechter. "A comparison between two anionic surfactants for mobility control of super critical CO2 in foam-assisted miscible EOR." Carbon Management Technology Conference. OnePetro, 2017. CMTC-486486-MS.
Almobarky, Mohammed, Zuhair A1Yousef, and David Schechter. "Enhancing the foam stability using surfactants mixtures." SPE Kingdom of Saudi Arabia Annual Technical Symposium and Exhibition. OnePetro, 2018. Apr. 23-26, 2018 Paper No. SPE-192449-MS DOI: https://doi.org/10.2118/192449-MS.
Alvarez, J. O., and D. S. Schechter. "Altering wettability in Bakken shale by surfactant additives and potential of improving oil recovery during injection of completion fluids." SPE improved oil recovery conference. OnePetro, 2016. SPE-179688-MS.
Alvarez, J. O., and David S. Schechter. "Wettability, oil and rock characterization of the most important unconventional liquid reservoirs in the United States and the impact on oil recovery." SPE/AAPG/SEG Unconventional Resources Technology Conference. OnePetro, 2016. Aug. 1-3, 2016 Paper No. URTEC-2461651-MS DOI: https://doi.org/10.15530/URTEC-2016-2461651.
Alvarez, J. O., F. D. Tovar, and D. S. Schechter. "Improving oil recovery in unconventional liquid reservoirs by soaking-flowback production schedule with surfactant additives." SPE Liquids-Rich Basins Conference—North America. OnePetro, Sep. 13-14, 2017 Paper No. SPE-187483-MS DOI: https://doi.org/10.2118/187483-MS.
Alvarez, Johannes O. "Wettability Alteration Using Surfactants to Improve Oil Recovery from Unconventional Liquid Reservoirs" Dissertation, Texas A&M University, 2017.
Alvarez, Johannes O., and David S. Schechter. "Wettability alteration and spontaneous imbibition in unconventional liquid reservoirs by surfactant additives." SPE Reservoir Evaluation & Engineering 20.01 (2017): 107-117. SPE-177057-MS.
Alvarez, Johannes O., et al. "Impact of surfactants for wettability alteration in stimulation fluids and the potential for surfactant EOR in unconventional liquid reservoirs." SPE Unconventional Resources Conference. OnePetro, 2014. SPE-169001-MS, 18 pages.
Alvarez, Johannes O., I. W. Saputra, and David S. Schechter. "The impact of surfactant imbibition and adsorption for improving oil recovery in the Wolfcamp and Eagle Ford Reservoirs." SPE Journal 23.06 (2018): 2103-2117. Oct. 9-11, 2017 Paper No. SPE-187176-MS DOI: https://doi.org/10.2118/187176-MS.
AlYousif, Zuhair, Mohammed Almobarky, and David Schechter. "Nanoparticles—Stabilized CO2/Brine Emulsions at Reservoir Conditions: A New Way of Mitigating Gravity Override in CO2 Floods." SPE Kingdom of Saudi Arabia Annual Technical Symposium and Exhibition. OnePetro, 2018. Apr. 23-26, 2018 Paper No. SPE-192383-MS DOI: https://doi.org/10.2118/192383-MS.
Alzobaidi, Shehab et al., "Continuous Flow Synthesis of Petroleum Sulfonates from Crude Oil and Formulation into Nano-Surfactants for Cost Efficient Oil Mobilization", SPE Kingdom of Saudi Arabia Annual Technical Symposium and Exhibition, Apr. 2018. SPE-192337-MS (2018).
Arthur, J. Daniel, et al. "Technical summary of oil & gas produced water treatment technologies." All Consulting, LLC, (2005). 53 pages.
Barnes, J. R. et al., "Application of Internal Olefin Sulfonates and Other Surfactants to EOR. Part 1:Structure—Performance Relationships for Selection at Different Reservoir Conditions", SPE Improved Oil Recovery Symposium, Society of Petroleum Engineers., Apr. 24-28, 2010 SPE-129766-MS, doi: 10.2118/129766-MS, Jan. 1, 2010.
Bennetzen, M. V. et al., "Dilute Surfactant Flooding Studies in a Low-PermeaPUbility Oil-Wet Middle East Carbonate", IPCT 17656, International Petroleum Technology Conference, 2014.
Chegenizadeh Negin, Saeedi Ali, Quan Xie, "Most common surfactants employed in chemical enhanced oil recovery", Petroleum, Elsevier, (Jun. 1, 2017), vol. 3, No. 2, doi:10.1016/j.petlm.2016.11.007, ISSN 2405-6561, pp. 197-211, XP055454870.
Dongmei Wang, Butler Raymond, Zhang Jin, Seright Randall, "Wettability Survey in Bakken Shale With Surfactant-Formulation Imbibition", SPE Reservoir Evaluation and Engineering, Society of Petroleum Engineers, Inc., US, US , (Dec. 1, 2012, vol. 15, No. 06, doi:10.2118/153853-PA, ISSN 1094-6470, pp. 695-705, XP055256946.
Dongmei Wang, Nalco Champion, Dongmei Wang, "Evaluation of Surfactants for Oil Recovery Potential in Shale Reservoirs", SPE, (Jan. 1, 2014), doi:10.2118/169085-MS, ISBN 978-1-61399-309-5, XP055516468.
Gizzatov, Ayrat et al., "Brine to Enhance the Transport of Encapsulated Petroleum Sulfonates Nanosurfactants Deeper into the High Temperature Carbonate Reservoirs", SPE Conference at Oman Petroleum & Energy Show, SPE-200222-MS (2022).
He, Lin et al., "Interfacial sciences in unconventional petroleum production from fundamentals to applications", Chemical Society Reviews, 55-72, vol. 44, pp. 5446-5494, XP055513422, Jan. 1, 2015, 5446-5494.
Hum, F., et al. "Is It possible to treat produced water for recycle and beneficial reuse?." SPE International Thermal Operations and Heavy Oil Symposium. OnePetro, 2005. Paper No. SPE-97685-MS. 13 pages.
Makhanov, K. et al., "Liquid uptake of gas shales: A workflow to estimate water loss during shut-in periods after fracturing operations", Journal of Unconventional Oil and Gas Resources, vol. 7, Sep. 1, 2014 (Sep. 1, 2014), pp. 22-32, XP55516517, ISSN: 2213-3976, DOI: 10.1016/j.juogr.2014.04.001 p. 22-31; figures tables., XP055516517.
Myers, Richard O. "An Overview of Today's Membranes and Membrane Processes." Corrosion 2000 (2000). Paper No. 00304. 10 pages.
Neog, Anirban, and David S. Schechter. "Investigation of surfactant induced wettability alteration in Wolfcamp shale for hydraulic fracturing and EOR applications." SPE Improved Oil Recovery Conference. OnePetro, 2016. SPE-179600-MS.
Patil, Pramod D. et al., "Surfactant Based EOR for Tight Oil Unconventional Reservoirs through Wettability Alteration: Novel Surfactant Formulations and Their Efficacy to Induce Spontaneous Imbibition", Unconventional Resources Technology Conference (URTeC) DOI 10.15530/urtec-2018-2896289, URTeC: 2896289, Jul. 23-25, 2018.
Patil, Pramod D., et al. "Surfactant based EOR for tight oil reservoirs through wettability alteration: novel surfactant formulations and their efficacy to induce spontaneous imbibition." SPE EOR Conference at Oil and Gas West Asia. OnePetro, 2018. Mar. 26-28, 2018 Paper No. SPE-190397-MS DOI: https://doi.org/10.2118/190397-MS.
PCT/ US2018/044715, International Preliminary Report on Patentability dated Feb. 13, 2020.
PCT/ US2018/044716, International Preliminary Report on Patentability dated Feb. 13, 2020.
PCT/US2015/050550, International Search Report & Written Opinion dated Nov. 26, 2015.
PCT/US2018/044707, International Preliminary Report on Patentability dated Feb. 4, 2020.
PCT/US2018/044707, International Search Report & Written Opinion dated Nov. 8, 2018.
PCT/US2018/044715, International Search Report & Written Opinion dated Nov. 2, 2018.
PCT/US2018/044716, International Search Report & Written Opinion dated Nov. 2, 2018.
Peeters, Jeff, et al. "Membrane technology treating oily wastewater for reuse." Corrosion 2005. OnePetro, 2005. Paper No. 05534. 15 pages.
Santos, Susan M., et al. "Ultrafiltration of water generated in oil and gas production." Water Environment Research 69.6 (1997): 1120-1127.
Saputra, I. W. R., and D. S. Schechter. "Comprehensive Workflow for Laboratory to Field-Scale Numerical Simulation to Improve Oil Recovery in the Eagle Ford Shale by Selective Testing and Modelling of Surfactants For Wettability Alteration." SPE/AAPG/SEG Unconventional Resources Technology Conference. OnePetro, 2018. Paper No. URTEC-2884598-MS DOI: https://doi.org/10.15530/URTEC-2018-2884598.

(56) References Cited

OTHER PUBLICATIONS

Tsang, Patrick, B., et al. "Economic evaluation of treating oilfield produced water for potable use." SPE International Thermal Operations and Heavy Oil Symposium and Western Regional Meeting. OnePetro, 2004. SPE 86948. 16 pages.
Valluri, M. K., J. O. Alvarez, and D. S. Schechter. "Study of the rock/fluid interactions of sodium and calcium brines with ultra-tight rock surfaces and their impact on improving oil recovery by spontaneous imbibition." SPE Low Perm Symposium. OnePetro, 2016. May 5-6, 2016 Paper No. SPE-180274-MS DOI: https://doi.org/10.2118/180274-MS.
Visvanathan, C., et al. "Volume reduction of produced water generated from natural gas production process using membrane technology." Water science and technology 41.10-11 (2000): 117-123.
Zaidi, A., et al. "Recent advances in the application of membrane technology for the removal of oil and suspended solids from produced waters." Produced Water: Technological/Environmental Issues and Solutions (1992): 489-501.
Zhang, Fan, et al. "Scaling for wettability alteration induced by the addition of surfactants in completion fluids: surfactant selection for optimum performance." SPE/AAPG/SEG Unconventional Resources Technology Conference. OnePetro, 2018. Jul. 23-25, 2018 Paper No. URTEC-2889308-MS DOI: https://doi.org/10.15530/URTEC-2018-2889308.
Zhang, Fan, et al. "Upscaling Laboratory Result of Surfactant-Assisted Spontaneous Imbibition to the Field Scale through Scaling Group Analysis, Numerical Simulation, and Discrete Fracture Network Model." SPE Improved Oil Recovery Conference. OnePetro, 2018. Apr. 14-18, 2018 Paper No. SPE-190155-MS DOI: https://doi.org/10.2118/190155-MS.
Zhang, Jieyuan et al., "Mechanisms of Enhanced Natural Imbibition with Novel Chemicals", Society of Petroleum Engineers. doi:10.2118/113453-PA, SPE-113453-PA, Dec. 1, 2009. Abstract.
Ashish Kumar et al., Diagnosing Fracture-Wellbore Connectivity Using Chemical Tracer Flowback Dator, URTeC 2902023, (Jul. 23, 2008), pp. I-10.

* cited by examiner

Aqueous Stability

Aqueous Stability

INJECTION FLUIDS FOR STIMULATING FRACTURED FORMATIONS

CROSS REFERENCE TO RELATED APPLICATIONS

This application claims the benefit of priority to U.S. Provisional Application 62/538,883, filed Jul. 31, 2017, which is incorporated by reference herein in its entirety.

TECHNICAL FIELD

The present disclosure relates generally to unconventional reservoirs, and more specifically to using low particle size injection fluids for treating unconventional subterranean formations.

BACKGROUND

Wells in unconventional or "tight" formations typically undergo multiple fracture stages which are completed in series during fracturing operations. To prop open fractures during such operations, specific cocktails of injection fluid are employed to viscosify the injection fluid and help transport proppant to the far reaches of the fracture, thereby establishing a larger propped fracture network and increased stimulated reservoir volume.

Typical injection fluids can include over a dozen chemical components which are mixed into a surface water, typically brackish or recycled production water. During fracturing operations (completions stage) of an unconventional horizontal well, the injection fluids with these additive chemicals are pumped down the well in large quantities (~10,000 bbls) and the injection fluid contacts the surfaces of the fracture network (FIG. 1A prior to fluid injection; FIG. 1B during fluid injection). Current injection fluids contain dirty water, unfiltered surface water, and/or oil carry-over in surface water. The condition of the injection fluid is such that it can be unstable when exposed to reservoir conditions, such as high temperature, high formation brine salinity, high divalent ion concentrations, etc. The unstable injection fluid can cause a loss in well productivity due to formation damage (FIG. 1C). The term "formation damage" in this context is used to refer to plugging off matrix permeability (which can be on the order of 100's of nano-Darcies) in the formation thus obstructing or hindering fluid flow, for example, due to the suspended particles in the injection fluid precipitating out of solution and causing the plugging.

Embodiments of the disclosure include compositions and methods that stabilize the injection fluid when exposed to reservoir conditions, reducing formation damage and increasing the amount of hydrocarbon recovered.

SUMMARY

Described herein are methods for stimulating an unconventional subterranean formation with a fluid. The methods can comprise introducing a low particle size injection fluid through a wellbore into the unconventional subterranean formation; allowing the low particle size injection fluid to imbibe into a rock matrix of the unconventional subterranean formation for a period of time; and producing fluids from the unconventional subterranean formation through the wellbore. The low particle size injection fluid can comprise an aqueous-based injection fluid and an anionic surfactant comprising a hydrophobic tail comprising from 6 to 60 carbon atoms. The low particle size injection fluid can have a maximum particle size of less than 0.1 micrometers in diameter in particle size distribution measurements performed at a temperature and salinity of the unconventional subterranean formation.

The anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise a C10-C30 internal olefin sulfonate, a C10-C30 isomerized olefin sulfonate, a C10-C30 alfa olefin sulfonate, a C8-C30 alkyl benzene sulfonate (ABS), a sulfosuccinate surfactant, or any combination thereof. In some examples, the anionic surfactant can comprise a branched or unbranched C6-C32:PO(0-65):EO(0-100)-carboxylate (e.g., a branched or unbranched C6-C30:PO(30-40):EO(25-35)-carboxylate, a branched or unbranched C6-C12:PO(30-40):EO(25-35)-carboxylate, a branched or unbranched C6-C30:EO(8-30)-carboxylate, or any combination thereof). In some examples, the anionic surfactant can comprise a surfactant defined by the formula below $R^1$—$R^2$—$R^3$ wherein $R^1$ comprises a branched or unbranched, saturated or unsaturated, cyclic or non-cyclic, hydrophobic carbon chain having 6-32 carbon atoms and an oxygen atom linking $R^1$ and $R^2$; $R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups. In some examples, the anionic surfactant can comprise a surfactant defined by the formula below

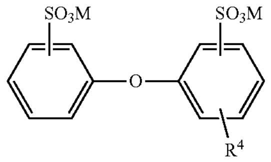

wherein $R^4$ is a branched or unbranched, saturated or unsaturated, cyclic or non-cyclic, hydrophobic carbon chain having 6-32 carbon atoms; and M represents a counterion (e.g., $Na^+$, $K^+$).

In some embodiments, the low particle size injection fluid can optionally further comprise one or more secondary surfactants. The one or more secondary surfactants can comprise one or more non-ionic surfactants, one or more additional anionic surfactants, one or more cationic surfactants, one or more zwitterionic surfactants, or any combination thereof. In some embodiments, the one or more secondary surfactants can comprise a non-ionic surfactant. In some examples, the non-ionic surfactant can comprise a branched or unbranched C6-C32:PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof).

Also described herein are methods for stimulating an unconventional subterranean formation with a fluid. The methods can comprise introducing a low particle size injection fluid through a wellbore into the unconventional subterranean formation; allowing the low particle size injection fluid to imbibe into a rock matrix of the unconventional subterranean formation for a period of time; and producing fluids from the unconventional subterranean formation through the wellbore. The low particle size injection fluid can comprise an aqueous-based injection fluid and a non-ionic surfactant comprising a hydrophobic tail comprising from 6 to 60 carbon atoms. The low particle size injection fluid can have a maximum particle size of less than 0.1 micrometers in diameter in particle size distribution measurements performed at a temperature and salinity of the unconventional subterranean formation.

In some examples, the non-ionic surfactant can comprise a branched or unbranched C6-C32:PO(0-65):EO(0-100) (e.g., a branched or unbranched C6-C30:PO(30-40):EO(25-35), or a branched or unbranched C6-C12:PO(30-40):EO (25-35)). In certain embodiments, the non-ionic surfactant can comprise a branched or unbranched C6-30:EO(8-30), or any combination thereof).

In some embodiments, the low particle size injection fluid can optionally further comprise one or more secondary surfactants. The one or more secondary surfactants can comprise one or more additional non-ionic surfactants, one or more anionic surfactants, one or more cationic surfactants, one or more zwitterionic surfactants, or any combination thereof.

In some embodiments, the one or more secondary surfactants can comprise an anionic surfactant. The anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise a C10-C30 internal olefin sulfonate, a C10-C30 isomerized olefin sulfonate, a C10-C30 alfa olefin sulfonate, a C8-C30 alkyl benzene sulfonate (ABS), a sulfosuccinate surfactant, or any combination thereof. In some examples, the anionic surfactant can comprise a branched or unbranched C6-C32:PO(0-65):EO(0-100)-carboxylate (e.g., a branched or unbranched C6-C30:PO(30-40):EO(25-35)-carboxylate, a branched or unbranched C6-C12:PO(30-40):EO(25-35)-carboxylate, a branched or unbranched C6-C30:EO(8-30)-carboxylate, or any combination thereof). In some examples, the anionic surfactant can comprise a surfactant defined by the formula below $$R^1—R^2—R^3$$

wherein $R^1$ comprises a branched or unbranched, saturated or unsaturated, cyclic or non-cyclic, hydrophobic carbon chain having 6-32 carbon atoms and an oxygen atom linking $R^1$ and $R^2$; $R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups. In some examples, the anionic surfactant can comprise a surfactant defined by the formula below

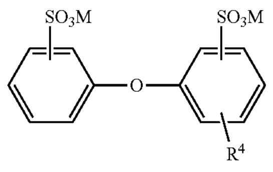

wherein $R^4$ is a branched or unbranched, saturated or unsaturated, cyclic or non-cyclic, hydrophobic carbon chain having 6-32 carbon atoms; and M represents a counterion (e.g., $Na^+$, $K^+$).

In the methods described above, the aqueous-based injection fluid can comprise any type of water, treated or untreated, and can vary in salt content. For example, the aqueous-based injection fluid can comprise sea water, brackish water, fresh water, flowback or produced water, wastewater (e.g., reclaimed or recycled), river water, lake or pond water, aquifer water, brine (e.g., reservoir or synthetic brine), or any combination thereof. In some embodiments, the aqueous-based injection fluid can comprise slickwater.

Optionally in the methods described above, the low particle size injection fluid can include one or more additional components. For example, the low particle size injection fluid can further comprise an acid, a polymer, a friction reducer, a gelling agent, a crosslinker, a scale inhibitor, a breaker, a pH adjusting agent, a non-emulsifier agent, an iron control agent, a corrosion inhibitor, a biocide, a clay stabilizing agent, a proppant, a wettability alteration chemical, a co-solvent (e.g., a C1-C5 alcohol, or an alkoxylated C1-C5 alcohol), or any combination thereof.

In some embodiments of the methods described herein, the low particle size injection fluid can be introduced at a wellhead pressure of from 0 PSI to 30,000 PSI (e.g., from 6,000 PSI to 30,000 PSI, or from 5,000 PSI to 10,000 PSI). The unconventional subterranean formation can have a temperature of from 75° F. to 350° F. (e.g., from 150° F. to 250° F.), a salinity of at least 5,000 ppm TDS (e.g., at least 100,000 ppm TDS, such as from 100,000 ppm to 300,000 ppm TDS), a permeability of less than 25 mD (e.g., from 10 to 0.1 millidarcy (mD)), or any combination thereof.

In some embodiments, the unconventional subterranean formation can comprise an oil-wet reservoir. In some embodiments, the unconventional subterranean formation can comprise a water-wet reservoir. In some embodiments, the unconventional subterranean formation can comprise naturally fractured carbonate. In some embodiments, the unconventional subterranean formation can comprise naturally fractured sandstone.

In some embodiments of the methods described herein, the method can further comprise ceasing introduction of the low particle size injection fluid through the wellbore into the unconventional subterranean formation before allowing step (b). In some embodiments, the period of time is from one day to one month. In some embodiments, the period of time is from two weeks to one month.

In some embodiments of the methods described herein, the method can further comprise adding a tracer to the low particle size injection fluid prior to introducing the low particle size injection fluid through the wellbore into the unconventional subterranean formation; recovering the tracer from the fluids produced from the unconventional subterranean formation through the wellbore, fluids recovered from a different wellbore in fluid communication with the unconventional subterranean formation, or any combination thereof; and comparing the quantity of tracer recovered from the fluids produced to the quantity of tracer introduced to the low particle size injection fluid.

In some embodiments of the methods described herein, the method can comprise stimulating a naturally fractured region of the unconventional subterranean formation proximate to a new wellbore. In some embodiments of the methods described herein, the method can comprise stimulating a naturally fractured region of the unconventional subterranean formation proximate to an existing wellbore. In some embodiments of the methods described herein, the method can comprise stimulating a previously fractured or previously refractured region of the unconventional subterranean formation proximate to a new wellbore. In some embodiments of the methods described herein, the method can comprise stimulating a previously fractured or previously refractured region of the unconventional subterranean formation proximate to an existing wellbore.

In some embodiments of the methods described herein, the method can further comprise producing fluids from the unconventional subterranean formation through the wellbore. The fluids can comprise a hydrocarbon.

BRIEF DESCRIPTION OF THE DRAWINGS

The drawings illustrate only example embodiments of methods, systems, and devices for stabilizing injection fluids and are therefore not to be considered limiting of its scope, as aspects of the disclosure may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIG. 1A shows a portion of the unconventional reservoir prior to injection of conventional injection fluids. FIG. 1B illustrates conventional injection fluids being injected into the portion of the unconventional reservoir shown in FIG. 1A. FIG. 1C shows trapped particles which plug off matrix permeability in the portion of the unconventional reservoir, left by conventional injection fluids after the injection fluid is released from the reservoir.

FIG. 2A shows a portion of the unconventional reservoir prior to the injection of low particle size injection fluids. FIG. 2B illustrates the injection of low particle size injection fluids into the portion of the unconventional reservoir shown in FIG. 2A where the insoluble particles are minimized and the chemicals penetrate the rock matrix. FIG. 2C shows the unconventional reservoir after the low particle size injection fluid is released from the reservoir leaving an increased transmissibility and improved productivity compared to use of conventional injection fluids.

DETAILED DESCRIPTION OF EXAMPLE EMBODIMENTS

Figure 1A:
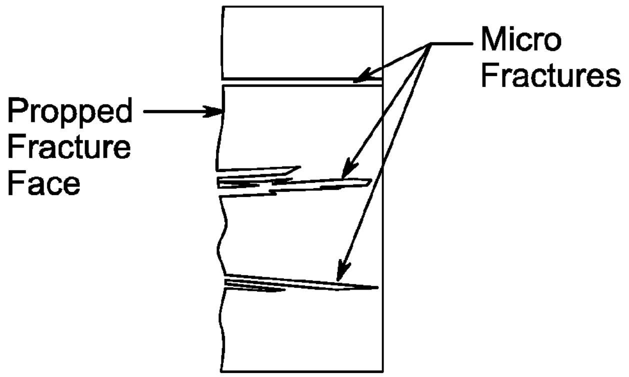
FIGS. 1A-1C illustrate some steps of a typical fracturing process using conventional injection fluids in an unconventional reservoir.
Figure 1B:
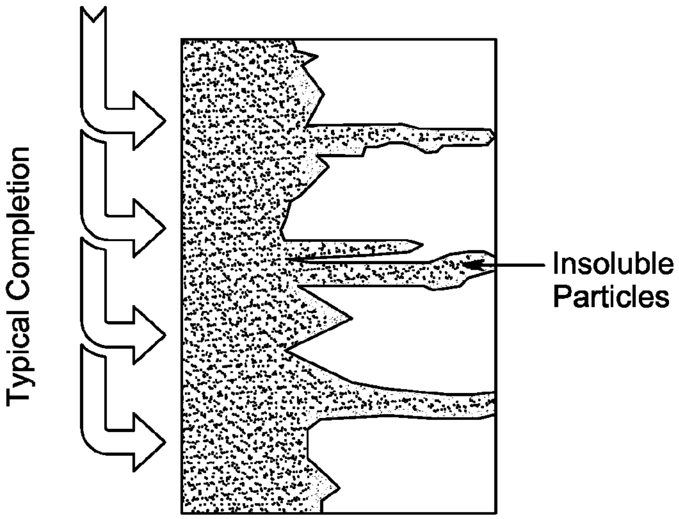

The example embodiments discussed herein are directed to compositions and methods of stabilizing injection fluids.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area).

"Unconventional formation" is a subterranean hydrocarbon-bearing formation that requires intervention in order to recover hydrocarbons from the reservoir at economic flow rates or volumes. For example, an unconventional formation includes reservoirs having an unconventional microstructure, such as having submicron pore size (a rock matrix with an average pore size less than 1 micrometer), in which fractures are used to recover hydrocarbons from the reservoir at sufficient flow rates or volumes (e.g., an unconventional reservoir must be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, or 0.001 mD or less). In some embodiments, the unconventional formation can include a reservoir having a permeability of at least 0.001 mD (e.g., at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.001 mD to 25 mD (e.g., from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD).

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (also known as oil or petroleum), gas hydrocarbons, a combination of liquid hydrocarbons and gas hydrocarbons (e.g. including gas condensate), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the term reservoir. For example, in some embodiments, the reservoir may be, but is not limited to, a shale reservoir, a carbonate reservoir, a tight sandstone reservoir, a tight siltstone reservoir, a gas hydrate reservoir, a coalbed methane reservoir, etc. Indeed, the terms "formation," "reservoir," "hydrocarbon," and the like are not limited to any description or configuration described herein.

"Wellbore" refers to a continuous hole for use in hydrocarbon recovery, including any openhole or uncased portion of the wellbore. For example, a wellbore may be a cylindrical hole drilled into the formation such that the wellbore is surrounded by the formation, including rocks, sands, sediments, etc. A wellbore may be used for injection. A wellbore may be used for production. A wellbore may be used for hydraulic fracturing of the formation. A wellbore even may be used for multiple purposes, such as injection and production. The wellbore may have vertical, inclined, horizontal, or a combination of trajectories. For example, the wellbore may be a vertical wellbore, a horizontal wellbore, a multilateral wellbore, or slanted wellbore. The wellbore may include a "build section." "Build section" refers to practically any section of a wellbore where the deviation is changing. As an example, the deviation is changing when the wellbore is curving. The wellbore may include a plurality of components, such as, but not limited to, a casing, a liner, a tubing string, a heating element, a sensor, a packer, a screen, a gravel pack, etc. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift. Some non-limiting examples of wellbores may be found in U.S. Patent Application Publication No. 2014/0288909 and U.S. Patent Application Publication No. 2016/0281494A1, each of which is incorporated by reference in its entirety. The term wellbore is not limited to any description or configuration described herein. The term wellbore may be used synonymously with the terms borehole or well.

"Single-phase liquid or fluid," as used herein, refers to a fluid which only has a single-phase, i.e. only a water phase. A single-phase fluid is not an emulsion. A single-phase fluid is in a thermodynamically stable state such that it does not macroscopically separate into distinct layers or precipitate out solid particles. In some embodiments, the single-phase liquid comprises a single-phase liquid surfactant package including one or more anionic and/or non-ionic surfactants.

"Aqueous stable," as used herein, refers to a solution whose soluble components remain dissolved and is a single phase as opposed to precipitating as particulates or phase separating into 2 or more phases. As such, aqueous stable solutions are clear and transparent statically and when agitated. Conversely, solutions may be described as "aqueous unstable" when components precipitate from solution as particulates or phase separates into 2 or more phases. The aqueous stability of solutions can be assessed by evaluating whether the Tyndall Effect (light scattering by suspended particulates) is observed when monochromatic light is directed through the solution. If a sample exhibits the Tyndall effect, the solution may be characterized as "aqueous unstable." Conversely, if a sample does not exhibit the Tyndall effect, the solution may be characterized as "aqueous stable."

"Slickwater," as used herein, refers to water-based injection fluid comprising a friction reducer which is typically pumped at high rates to fracture a reservoir. Optionally when employing slickwater, smaller sized proppant particles (e.g., 40/70 or 50/140 mesh size) are used due to the fluid having a relatively low viscosity (and therefore a diminished ability to transport sizable proppants relative to more viscous fluids). In some embodiments, proppants are added to some stages of completion/stimulation during production of an unconventional reservoir. In some embodiments, slickwater is injected with a small quantity of proppant.

"Friction reducer," as used herein, refers to a chemical additive that alters fluid rheological properties to reduce friction created within the fluid as it flows through small-diameter tubulars or similar restrictions (e.g., valves, pumps). Generally polymers, or similar friction reducing agents, add viscosity to the fluid, which reduces the turbulence induced as the fluid flows. Reductions in fluid friction of greater than 50% are possible depending on the friction reducer utilized, which allows the injection fluid to be injected into a wellbore at a much higher injection rate (e.g., between 60 to 100 barrels per minute) and also lower pumping pressure during proppant injection.

"Injection fluid" or "LPS injection fluid," as used herein, refers to any fluid which is injected into a reservoir via a well. The injection fluid may include one or more of an acid, a polymer, a friction reducer, a gelling agent, a crosslinker, a scale inhibitor, a breaker, a pH adjusting agent, a non-emulsifier agent, an iron control agent, a corrosion inhibitor, a biocide, a clay stabilizing agent, a proppant, a wettability alteration chemical, a co-solvent (e.g., a C1-C5 alcohol, or an alkoxylated C1-C5 alcohol), or any combination thereof, to increase the efficacy of the injection fluid.

"Low particle size injection fluid" refers to an injection fluid having a maximum particle size of less than 0.1 micrometers in diameter in particle size distribution measurements performed at a temperature and salinity of the unconventional formation for which injection is to occur. For example, the low particle size injection fluid can be formed by mixing an aqueous-based injection fluid with a single-phase fluid comprising a single-phase liquid surfactant package. Prior to being dosed with the anionic or non-ionic surfactant to form the low particle size injection fluid, the aqueous based fluid may have been used as the injection fluid.

"Fracturing fluid," as used herein, refers to an injection fluid that is injected into the well under pressure in order to cause fracturing within a portion of the reservoir.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

Unless defined otherwise, all technical and scientific terms used herein have the same meanings as commonly understood by one of skill in the art to which the disclosed invention belongs. Unless otherwise specified, all percentages are in weight percent and the pressure is in atmospheres.

The compositions and methods described herein relate to compositions and methods described in PCT/US2018/044707, filed Jul. 31, 2018 (corresponding to U.S. patent application Ser. Nos. 16/635,733, and 18/464,691, published as U.S. Patent Publication Nos. 2021/0095184, and 2024/0271032, issued as U.S. Pat. Nos. 11,753,582, and 12,435,262); filed Jul. 31, 2018 entitled "Injection Fluids Comprising Anionic Surfactants for Treating Unconventional Formations"); PCT/US2018044715, filed Jul. 31, 2018 (corresponding to U.S. patent application Ser. No. 16/635,904 published as U.S. Patent Publication No. 2020/0317992 issued as U.S. Pat. Nos. 11,760,921); filed Jul. 31, 2018 entitled "Injection Fluids Comprising Non-Ionic Surfactants for Treating Unconventional Formations"), all of which are hereby incorporated by reference.

Compositions

An embodiment of the disclosure is a single-phase liquid surfactant package which decreases the particle size distribution when combined with an aqueous-based injection fluid to create a low particle size (LPS) injection fluid. The low particle size injection fluid can have a maximum particle size of less than 0.1 micrometers in diameter in particle size distribution measurements performed at a temperature and salinity of the unconventional subterranean formation. In specific embodiments, after injection into a reservoir, the LPS injection fluid retains the lowered particle size distribution within the reservoir. In certain embodiments, the LPS injection fluid lowers the particle size distribution of the reservoir fluid after being injected into the reservoir and mixing with the reservoir fluid. In embodiments, the aqueous-based injection fluid when combined with the single-phase liquid surfactant package maintains itself as a single-phase, that is, as the LPS injection fluid is pumped downhole it remains a homogenous single-phase solution within the reservoir, even when mixed with the native reservoir fluid.

The single-phase liquid surfactant package can comprise a primary surfactant and optionally one or more secondary surfactants. The primary surfactant can comprise an anionic surfactant or a non-ionic surfactant. The one or more secondary surfactants can comprise one or more non-ionic surfactants, one or more anionic surfactants, one or more cationic surfactants, one or more zwitterionic surfactants, or any combination thereof.

In some embodiments, the primary surfactant can comprise at least 10% by weight (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight) of the single-phase liquid surfactant package, based on the total weight of the single-phase liquid surfactant package. In some embodiments, the primary surfactant can comprise 90% by weight or less (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) of the single-phase liquid surfactant package, based on the total weight of the single-phase liquid surfactant package.

The primary surfactant can be present in the single-phase liquid surfactant package in an amount ranging from any of the minimum values described above to any of the maximum values described above. For example, in some embodiments, the primary surfactant can comprise from 10% to 90% by weight (e.g., from 10% to 50% by weight) of the single-phase liquid surfactant package, based on the total weight of the single-phase liquid surfactant package.

In some embodiments, the one or more secondary surfactants can comprise at least 10% by weight (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight) of the single-phase liquid surfactant package, based on the total weight of the single-phase liquid surfactant package. In some embodiments, the one or more secondary surfactants can comprise 90% by weight or less (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) of the single-phase liquid surfactant package, based on the total weight of the single-phase liquid surfactant package.

The one or more secondary surfactants can be present in the single-phase liquid surfactant package in an amount ranging from any of the minimum values described above to any of the maximum values described above. For example, in some embodiments, the one or more secondary surfactants can comprise from 10% to 90% by weight (e.g., from 10% to 50% by weight) of the single-phase liquid surfactant package, based on the total weight of the single-phase liquid surfactant package.

In some embodiments, the single-phase liquid surfactant package can comprise an anionic surfactant. In other embodiments, the single-phase liquid surfactant package can consist essentially of an anionic surfactant (i.e., the anionic surfactant is the only surfactant present in the single-phase liquid surfactant package). In other embodiments, the single-phase liquid surfactant package can consist of an anionic surfactant. In some of these embodiments, the single-phase liquid surfactant package further includes water. In some of these embodiments, the single-phase liquid surfactant package does not comprise a hydrocarbon.

In some embodiments, the single-phase liquid surfactant package can comprise a non-ionic surfactant. In other embodiments, the single-phase liquid surfactant package can consist essentially of a non-ionic surfactant (i.e., the non-ionic surfactant is the only surfactant present in the single-phase liquid surfactant package). In other embodiments, the single-phase liquid surfactant package can consist of a non-ionic surfactant. In some of these embodiments, the single-phase liquid surfactant package further includes water. In some of these embodiments, the single-phase liquid surfactant package does not comprise a hydrocarbon.

In some embodiments, the single-phase liquid surfactant package can comprise an anionic surfactant and a non-ionic surfactant. In other embodiments, the single-phase liquid surfactant package can consist essentially of an anionic surfactant and a non-ionic surfactant (i.e., the anionic surfactant and the non-ionic surfactant are the only surfactants present in the single-phase liquid surfactant package). In other embodiments, the single-phase liquid surfactant package can consist of an anionic surfactant and a non-ionic surfactant. In some of these embodiments, the single-phase liquid surfactant package further includes water. In some of these embodiments, the single-phase liquid surfactant package does not comprise a hydrocarbon.

In some embodiments, the single-phase liquid surfactant package can comprise an anionic surfactant, a second anionic surfactant, and a non-ionic surfactant. In other embodiments, the single-phase liquid surfactant package can consist essentially of an anionic surfactant, a second anionic surfactant, and a non-ionic surfactant (i.e., the anionic surfactant, the second anionic surfactant, and the non-ionic surfactant are the only surfactants present in the single-phase liquid surfactant package). In other embodiments, the single-phase liquid surfactant package can consist of an anionic surfactant, a second anionic surfactant, and a non-ionic surfactant. In some of these embodiments, the single-phase liquid surfactant package further includes water. In some of these embodiments, the single-phase liquid surfactant package does not comprise a hydrocarbon.

Suitable anionic surfactants include a hydrophobic tail that comprises from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise an internal olefin sulfonate (IOS), an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di)sulfonate, an alcohol sulfate, an alkoxy sulfate, an alkoxy sulfonate, an alkoxy carboxylate, an alcohol phosphate, or an alkoxy phosphate. In some embodiments, the anionic surfactant can comprise an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkoxy carboxylate surfactant" or "alkoxy carboxylate" refers to a compound having an alkyl or aryl attached to one or more alkoxylene groups (typically —$CH_2$—CH (ethyl)-O—, —$CH_2$—CH(methyl)-O—, or —$CH_2$—$CH_2$—O—) which, in turn is attached to —COO— or acid or salt thereof including metal cations such as sodium. In embodiments, the alkoxy carboxylate surfactant can be defined by the formulae below:

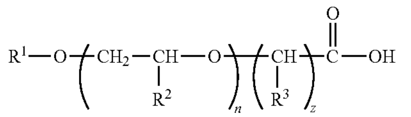

or

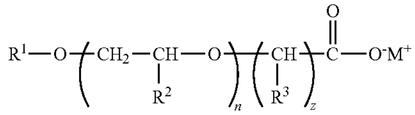

wherein $R^1$ is substituted or unsubstituted C6-C36 alkyl or substituted or unsubstituted aryl; $R^2$ is, independently for each occurrence within the compound, hydrogen or unsubstituted C1-C6 alkyl; $R^3$ is independently hydrogen or unsubstituted C1-C6 alkyl, n is an integer from 0 to 175, z is an integer from 1 to 6 and $M^+$ is a monovalent, divalent or trivalent cation. In some of these embodiments, $R^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—$CH_2$—CH(methyl)-O— linkers), attached in turn to from 0 to 100 ethyleneoxy groups (—$CH_2$—$CH_2$—O— linkers), attached in turn to —COO— or an acid or salt thereof including metal cations such as sodium). In certain embodiments, the alkoxy carboxylate can be a branched or unbranched C6-C30:PO(30-40):EO(25-35)-carboxylate. In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkoxy sulfate surfactant has the formula R—$(BO)_e$—$(PO)_f$—$(EO)_g$—$SO_3^-$ or acid or salt (including metal cations such as sodium) thereof, wherein R is C6-C32 alkyl, BO is —$CH_2$—CH(ethyl)-O—, PO is —$CH_2$—CH(methyl)-O—, and EO is —$CH_2$—$CH_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —$SO_3^-$ or acid or salt thereof including metal cations such as sodium.

An "aryl sulfate surfactant" or "aryl sulfate" refers to a compound having an aryl group attached to —O—$SO_3^-$ or acid or salt thereof including metal cations such as sodium. An "aryl sulfonate surfactant" or "aryl sulfonate" refers to a compound having an aryl group attached to —$SO_3^-$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" refers to an unsaturated hydrocarbon compound comprising at least one carbon-carbon double bond and at least one $SO_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to the single-phase liquid surfactant package when the LPS injection fluid is intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In embodiments, the anionic surfactant can be an alkylbenzene sulfonate or a dibenzene disufonate. In embodiments, the anionic surfactant can be benzenesulfonic acid, decyl(sulfophenoxy)-disodium salt; linear or branched C6-C36 alkyl: PO(0-65):EO(0-100) sulfate; or linear or branched C6-C36 alkyl:PO(0-65):EO(0-100) carboxylate. In embodiments, the anionic surfactant is an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant is a Guerbet-PO(0-65)-EO(0-100) carboxylate (Guerbet portion can be C6-C36). In some embodiments, the anionic surfactant is alkyl PO(0-65) and EO(0-100) sulfonate: where the alkyl group is linear or branched C6-C36. In some embodiments, the anionic surfactant is a sulfosuccinate, such as a dialkylsulfosuccinate. In some embodiments, the anionic surfactant is an alkyl aryl sulfonate (AAS) (e.g. an alkyl benzene sulfonate (ABS)), a C10-C30 internal olefin sulfate (IOS), a petroleum sulfonate, or an alkyl diphenyl oxide (di)sulfonate.

In some examples, the anionic surfactant can comprise a surfactant defined by the formula below:

$R^1$—$R^2$—$R^3$ wherein $R^1$ comprises a branched or unbranched, saturated or unsaturated, cyclic or non-cyclic, hydrophobic carbon chain having 6-32 carbon atoms and an oxygen atom linking $R^1$ and $R^2$; $R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups.

In some examples, the anionic surfactant can comprise a surfactant defined by the formula below:

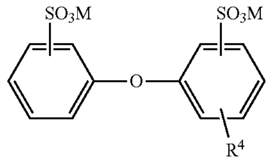

wherein $R^4$ is a branched or unbranched, saturated or unsaturated, cyclic or non-cyclic, hydrophobic carbon chain having 6-32 carbon atoms; and M represents a counterion (e.g., $Na^+$, $K^+$). In some embodiments, $R^4$ is a branched or unbranched, saturated or unsaturated, cyclic or non-cyclic, hydrophobic carbon chain having 6-16 carbon atoms.

Suitable non-ionic surfactants include compounds that can be added to increase wettability. In embodiments, the hydrophilic-lipophilic balance (HLB) of the non-ionic surfactant is greater than 10 (e.g., greater than 9, greater than 8, or greater than 7). In some embodiments, the HLB of the non-ionic surfactant is from 7 to 10.

The non-ionic surfactant can comprise a hydrophobic tail comprising from 6 to 60 carbon atoms. In some embodiments, the non-ionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, the non-ionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may comprise single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 EOs. The hydrophilic moiety is an alkyleneoxy chain (e.g., an ethoxy (EO), butoxy (BO) and/or propoxy (PO) chain with two or more repeating units of EO, BO, and/or PO). In some embodiments, 1-100 repeating units of EO are present. In some embodiments, 0-65 repeating units of PO are present. In some embodiments, 0-25 repeating units of BO are present. For example, the non-ionic surfactant could comprise 10EO:5PO or 5EO. In embodiments, the non-ionic surfactant may be a mix of surfactants with different length lipophilic tail chain lengths. For example, the non-ionic surfactant may be C9-C11:PO9:EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11: 9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32: PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof). In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. “Zwitterionic” or “zwitterion” as used herein refers to a neutral molecule with a positive (or cationic) and a negative (or anionic) electrical charge at different locations within the same molecule. Example zwitterionic surfactants include betains and sultains.

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211, 837, 9,422,469, 9,605,198, and 9,617,464; WIPO Patent Application Nos. WO/2008/079855, WO/2012/027757 and WO/2011/094442; as well as U.S. Patent Application Nos. 2005/0199395, 2006/0185845, 2006/0189486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, 2010/0292110, and 2017/0198202, each of which is hereby incorporated by reference herein in its entirety for its description of example surfactants.

Optionally, the single-phase liquid surfactant package can include one or more additional components. For example, the single-phase liquid surfactant package can further comprise an acid, a polymer, a friction reducer, a gelling agent, a crosslinker, a scale inhibitor, a breaker, a pH adjusting agent, a non-emulsifier agent, an iron control agent, a corrosion inhibitor, a biocide, a clay stabilizing agent, a proppant, a wettability alteration chemical, a co-solvent (e.g., a C1-C5 alcohol, or an alkoxylated C1-C5 alcohol), or any combination thereof.

In some embodiments, the single-phase liquid surfactant package can further include one or more co-solvents. Suitable co-solvents include alcohols, such as lower carbon chain alcohols such as isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycol ethers, ethoxylated phenol, or any other common organic co-solvent or combinations of any two or more co-solvents. In one embodiment, the co-solvent can comprise alkyl ethoxylate (C1-C6)-XEO X=1-30-linear or branched. In some embodiments, the co-solvent can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), or any combination thereof.

Prior to injection into a well, the single-phase liquid surfactant package is combined with an aqueous-based injection fluid to form an LPS injection fluid. The single-phase liquid surfactant package may be added directly into the aqueous-based injection fluid, or the single-phase liquid surfactant package may be diluted (e.g., with water or an aqueous-based injection fluid) prior to being added to the injection fluid. In embodiments, the aqueous-based injection fluid prior to addition of the single-phase liquid surfactant package is an aqueous-based injection fluid that was previously injected into the well. When added, the single-phase liquid surfactant package can decrease the particle size distribution within the aqueous-based injection fluid, creating an LPS injection fluid.

In example embodiments, the aqueous-based injection fluid can comprise any type of water, treated or untreated, and can vary in salt content. For example, the aqueous-based injection fluid can comprise sea water, brackish water, fresh water, flowback or produced water, wastewater (e.g., reclaimed or recycled), river water, lake or pond water, aquifer water, brine (e.g., reservoir or synthetic brine), or any combination thereof. In some embodiments, the aqueous-based injection fluid can comprise slickwater.

The LPS injection fluids can comprise from 30% to 99.85% by weight of the total composition of water, for example from 70% to 98% water.

In some embodiments, the aqueous-based injection fluid can include an acid, a polymer, a friction reducer, a gelling agent, a crosslinker, a breaker, a pH adjusting agent, a non-emulsifier agent, an iron control agent, a scale inhibitor, a corrosion inhibitor, a biocide, a clay stabilizing agent, a proppant, a wettability alteration chemical, a co-solvent (e.g., a C1-C5 alcohol, or an alkoxylated C1-C5 alcohol), or any combination thereof. In certain embodiments, the aqueous-based injection fluid can comprise an acid (e.g., at least 10% acid, such as from 10% to 20% by weight acid). In certain embodiments, the injection fluid can comprise a proppant.

Once combined with the aqueous-based injection fluid, the primary surfactant can have a concentration within the low particle size injection fluid of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the low particle size injection fluid. In some embodiments, the primary surfactant can have a concentration within the low particle size injection fluid of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the LPS injection fluid. In particular embodiments, the primary surfactant can have a concentration within the low particle size injection fluid of less than 1%, less than 0.5%, less than 0.2%, less than 0.1%, less than 0.075%, or less than 0.05%.

The primary surfactant can have a concentration within the low particle size injection fluid ranging from any of the minimum values described above to any of the maximum values described above. For example, in some embodiments, the primary surfactant can have a concentration within the low particle size injection fluid of from 0.01% to 2.5% by weight (e.g., from 0.05% to 0.5% by weight), based on the total weight of the low particle size injection fluid.

When present, the one or more secondary surfactants can have a concentration within the low particle size injection fluid of at least 0.001% by weight (e.g., at least 0.005% by weight, at least 0.01% by weight, at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the low particle size injection fluid. In some embodiments, the one or more secondary surfactants can have a concentration within the low particle size injection fluid of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, 0.02% by weight or less, 0.01% by weight or less, or 0.005% by weight or less), based on the total weight of the LPS injection fluid. In particular embodiments, the one or more secondary surfactants can have a concentration within the low particle size injection fluid of less than 2%, less than 1.5%, less than 1%, less than 0.5%, less than 0.2%, less than 0.1%, less than 0.075%, less than 0.05%, or less than 0.01%.

When present, the one or more secondary surfactants can have a concentration within the low particle size injection fluid ranging from any of the minimum values described above to any of the maximum values described above. For example, in some embodiments, the one or more secondary surfactants can have a concentration within the low particle size injection fluid of from 0.001% to 2.5% by weight (e.g., from 0.001% to 1.5% by weight, or from 0.05% to 0.5% by weight), based on the total weight of the low particle size injection fluid.

In some embodiments, the primary surfactant and one or more secondary surfactants can be present in the LPS injection fluid, the single-phase liquid surfactant package, or both in a weight ratio of primary surfactant to one or more secondary surfactants of at least 1:1 (e.g., at least 2:1, at least 2.5:1, at least 3:1, at least 4:1, at least 5:1, at least 6:1, at least 7:1, at least 8:1, or at least 9:1). In some embodiments, the primary surfactant and one or more secondary surfactants can be present in the LPS injection fluid, the single-phase liquid surfactant package, or both in a weight ratio of primary surfactant to one or more secondary surfactants of 10:1 or less (e.g., 9:1 or less; 8:1 or less, 7:1 or less, 6:1 or less, 5:1 or less, 4:1 or less, 3:1 or less, 2.5:1 or less, or 2:1 or less).

The primary surfactant and one or more secondary surfactants can be present in the LPS injection fluid, the single-phase liquid surfactant package, or both in a weight ratio ranging from any of the minimum values described above to any of the maximum values described above. For example, the primary surfactant and one or more secondary surfactants can be present in the LPS injection fluid, the single-phase liquid surfactant package, or both in a weight ratio of primary surfactant to one or more secondary surfactants of from 1:1 to 10:1 (e.g., 1:1 to 5:1).

In other embodiments, the one or more secondary surfactants are absent (i.e., the primary surfactant is the only surfactant present in the single-phase liquid surfactant package).

In some embodiments, the total concentration of all surfactants in the LPS injection fluid (the total concentration of the primary surfactant and the one or more secondary surfactants in the LPS injection fluid) can be at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, or at least 4.75% by weight), based on the total weight of the LPS injection fluid. In some embodiments, the total concentration of all surfactants in the LPS injection fluid (the total concentration of the primary surfactant and the one or more secondary surfactants in the LPS injection fluid) can be 5% by weight or less (e.g., 4.75% by weight or less, 4.5% by weight or less, 4.25% by weight or less, 4% by weight or less, 3.75% by weight or less, 3.5% by weight or less, 3.25% by weight or less, 3% by weight or less, 2.75% by weight or less, 2.5% by weight or less, 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the LPS injection fluid.

The total concentration of all surfactants in the LPS injection fluid (the total concentration of the primary surfactant and the one or more secondary surfactants in the LPS injection fluid) can range from any of the minimum values described above to any of the maximum values described above. For example, in some embodiments, the total concentration of all surfactants in the LPS injection fluid (the total concentration of the primary surfactant and the one or more secondary surfactants in the LPS injection fluid) can be from 0.01% by weight to 5% by weight (e.g., from 0.01% to 2.5% by weight, from 0.01% to 1% by weight, or from 0.01% to 0.5% by weight).

In some embodiments when the LPS injection fluid is being injected into a horizontal well, the total concentration of all surfactants in the LPS injection fluid (the total concentration of the primary surfactant and the one or more secondary surfactants in the LPS injection fluid) can be from 0.01% to 1.5% by weight, from 0.01% to 1% by weight, or from 0.01% to 0.5% by weight).

In some embodiments when the LPS injection fluid is being injected into a vertical well, the total concentration of all surfactants in the LPS injection fluid (the total concentration of the primary surfactant and the one or more secondary surfactants in the LPS injection fluid) can be from 0.01% to 5% by weight, from 0.01% to 1% by weight, from 0.5% to 5% by weight, from 0.5% to 2.5% by weight, from 0.5% to 1.5% by weight, from 0.5% to 1% by weight, from 1% to 5% by weight, from 1% to 2.5% by weight, from or 1% to 1.5% by weight).

When present, the one or more co-solvents can have a concentration within the low particle size injection fluid of less than 2%, less than 1.5%, less than 1%, less than 0.5%, less than 0.2%, less than 0.1%, less than 0.075%, less than 0.05%, or less than 0.01%. For example, the one or more co-solvents can have a concentration within the low particle size injection fluid of from 0.001% to 1.5% by weight (e.g., 0.05% to 0.5% by weight), based on the total weight of the low particle size injection fluid.

After the single-phase liquid surfactant package has been combined with the aqueous-based injection fluid, the LPS injection fluid may be a single-phase fluid or may be an emulsion depending on the amount of oil within the injection fluid.

In some embodiments, the single-phase liquid surfactant package (and by extension the LPS injection fluid) can comprise a non-ionic surfactant and an anionic surfactant (e.g., a sulfonate or disulfonate). In some embodiments, the single-phase liquid surfactant package (and by extension the LPS injection fluid) can comprise a non-ionic surfactant and two or more anionic surfactants (e.g., a sulfonate or disulfonate and a carboxylate). In some embodiments, the single-phase liquid surfactant package (and by extension the LPS injection fluid) can comprise a non-ionic surfactant (e.g., a C6-C16 alkyl phenol ethoxylate, or a C6-C16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol) and a sulfonate surfactant (e.g., a C10-16 disulfonate, or a C16-28 IOS). In some embodiments, the single-phase liquid surfactant package (and by extension the LPS injection fluid) can comprise a non-ionic surfactant (e.g., a C6-C16 alkyl phenol ethoxylate, or a C6-16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol), a sulfonate surfactant (e.g., a C10-16 disulfonate, or a C16-28 OS), and a carboxylate surfactant (e.g., a C10-16 alkyl polyglucoside carboxylate or a C22-C36 Guerbet alkoxylated carboxylate).

Specific example embodiments include the LPS injection fluids in the table below.

| LPS Injection Fluid | Surfactants and Co-Surfactants in LPS Injection Fluid (in weight percent) |
|---|---|
| 1 | 0.09% alkoxylated C6-C16 alcohol<br>0.06% disulfonate |
| 2 | 0.1% alkoxylated C6-C16 alcohol<br>0.1% carboxylate<br>0.1% disulfonate |
| 3 | 0.15% alkoxylated C6-C16 alcohol<br>0.075% carboxylate<br>0.075% disulfonate |
| 4 | 0.2% alkoxylated C6-C16 alcohol<br>0.1% carboxylate |
| 5 | 0.2% alkoxylated C6-C16 alcohol<br>0.033% carboxylate<br>0.066% disulfonate |
| 6 | 0.2% alkoxylated C6-C16 alcohol<br>0.033% carboxylate<br>0.066% disulfonate |
| 7 | 0.2% alkoxylated C6-C16 alcohol<br>0.05% carboxylate<br>0.05% olefin sulfonate |
| 8 | 0.15% alkoxylated C6-C16 alcohol<br>0.05% carboxylate<br>0.05% olefin sulfonate<br>0.05% alkyl polyglucoside |
| 9 | 0.1% alkoxylated C6-C16 alcohol<br>0.05% carboxylate<br>0.05% olefin sulfonate<br>0.1% alkyl polyglucoside |
| 10 | 0.15% alkoxylated C6-C16 alcohol<br>0.07% carboxylate<br>0.03% olefin sulfonate<br>0.1% alkyl polyglucoside |
| 11 | 0.1% alkoxylated C6-C16 alcohol<br>0.04% carboxylate<br>0.05% olefin sulfonate<br>0.03% disulfonate<br>0.1% alkyl polyglucoside |
| 12 | 0.1% alkoxylated C6-C16 alcohol<br>0.04% carboxylate<br>0.06% disulfonate<br>0.1% alkyl polyglucoside |
| 13 | 0.15% alkoxylated C6-C16 alcohol<br>0.15% alkoxylated alkylphenol<br>0.1% olefin sulfonate<br>0.1% Guerbet alkoxylated carboxylate |
| 14 | 0.125% alkoxylated C6-C16 alcohol<br>0.175% alkoxylated alkylphenol<br>0.1% olefin sulfonate<br>0.1% Guerbet alkoxylated carboxylate |
| 15 | 0.1% alkoxylated C6-C16 alcohol<br>0.2% alkoxylated alkylphenol<br>0.1% olefin sulfonate<br>0.1% Guerbet alkoxylated carboxylate |
| 16 | 0.12% alkoxylated C6-C16 alcohol<br>0.22% alkoxylated alkylphenol<br>0.08% olefin sulfonate<br>0.08% Guerbet alkoxylated carboxylate |
| 17 | 0.15% alkoxylated C6-C16 alcohol<br>0.15% alkoxylated alkylphenol<br>0.08% olefin sulfonate<br>0.06% Guerbet alkoxylated carboxylate<br>0.06% carboxylate |
| 18 | 0.15% alkoxylated C6-C16 alcohol<br>0.15% alkoxylated alkylphenol<br>0.05% olefin sulfonate<br>0.1% Guerbet alkoxylated carboxylate<br>0.05% disulfonate |

-continued

| LPS Injection Fluid | Surfactants and Co-Surfactants in LPS Injection Fluid (in weight percent) |
|---|---|
| 19 | 0.5% olefin sulfonate<br>0.5% Guerbet alkoxylated carboxylate<br>0.55% glycosides or glucosides |
| 20 | 0.5% olefin sulfonate<br>0.5% Guerbet alkoxylated carboxylate<br>0.5% glycosides or glucosides<br>0.25% alkoxylated C6-C16 alcohol |
| 21 | 0.5% olefin sulfonate<br>0.5% Guerbet alkoxylated carboxylate<br>0.5% glycosides or glucosides<br>0.5% alkoxylated C6-C16 alcohol |
| 22 | 0.5% olefin sulfonate<br>0.5% Guerbet alkoxylated carboxylate<br>1% glycosides or glucosides<br>0.5% alkoxylated C6-C16 alcohol |
| 23 | 0.05% olefin sulfonate<br>0.05% Guerbet alkoxylated carboxylate<br>0.05% glycosides or glucosides<br>0.05% alkoxylated C6-C16 alcohol |
| 24 | 0.075% glycosides or glucosides<br>0.075% alkoxylated C6-C16 alcohol |
| 25 | 0.1% alkoxylated C6-C16 alcohol<br>0.05% disulfonate |
| 26 | 0.1% alkoxylated C6-C16 alcohol<br>0.05% disulfonate<br>0.03% hydroxyalkyl alkylammonium chloride |
| 27 | 0.03% olefin sulfonate<br>0.04% Guerbet alkoxylated carboxylate<br>0.08% glycosides or glucosides<br>0.05% alkoxylated C6-C16 alcohol |
| 28 | 0.4% olefin sulfonate<br>0.4% Guerbet alkoxylated carboxylate<br>0.7% glycosides or glucosides<br>0.5% alkoxylated C6-C16 alcohol |
| 29 | 0.05% olefin sulfonate<br>0.1% glycosides or glucosides<br>0.05% alkoxylated C6-C16 alcohol |
| 30 | 0.05% olefin sulfonate<br>0.1% alkyl polyglucoside<br>0.05% alkoxylated C6-C16 alcohol |
| 31 | 0.05% olefin sulfonate<br>0.1% glycosides or glucosides<br>0.05% alkoxylated C6-C16 alcohol |
| 32 | 0.05% olefin sulfonate<br>0.1% alkyl polyglucoside<br>0.05% alkoxylated C6-C16 alcohol |
| 33 | 0.05% olefin sulfonate<br>0.1% alkyl polyglucoside<br>0.05% alkoxylated C6-C16 alcohol |
| 34 | 0.05% olefin sulfonate<br>0.05% glycosides or glucosides<br>0.05% alkoxylated C6-C16 alcohol<br>0.05% carboxylate |
| 35 | 0.05% olefin sulfonate<br>0.05% glycosides or glucosides<br>0.05% alkoxylated C6-C16 alcohol<br>0.05% carboxylate |
| 36 | 0.05% olefin sulfonate<br>0.05% alkyl polyglucoside<br>0.05% alkoxylated C6-C16 alcohol |
| 37 | 0.06% olefin sulfonate<br>0.05% alkyl polyglucoside<br>0.04% alkoxylated C6-C16 alcohol |
| 38 | 0.04% olefin sulfonate<br>0.08% glycosides or glucosides<br>0.05% alkoxylated C6-C16 alcohol<br>0.03% disulfonate |
| 39 | 0.035% olefin sulfonate<br>0.075% glycosides or glucosides<br>0.05% alkoxylated C6-C16 alcohol<br>0.04% disulfonate |
| 40 | 0.035% olefin sulfonate<br>0.07% glycosides or glucosides<br>0.045% alkoxylated C6-C16 alcohol<br>0.05% disulfonate |

-continued

| LPS Injection Fluid | Surfactants and Co-Surfactants in LPS Injection Fluid (in weight percent) |
|---|---|
| 41 | 0.1% alkoxylated C6-C16 alcohol<br>0.1% disulfonate |
| 42 | 0.25% Guerbet alkoxylated carboxylate<br>0.25% olefin sulfonate<br>0.5% glycosides or glucosides<br>0.5% co-solvent |
| 43 | 0.075% alkoxylated C12-C22 alcohol<br>0.075% disulfonate |
| 44 | 0.075% alkoxylated C6-C16 Guerbet alcohol<br>0.075% disulfonate |
| 45 | 0.075% alkoxylated C6-C16 Guerbet alcohol<br>0.075% disulfonate |
| 46 | 0.075% alkoxylated C6-C16 alcohol<br>0.075% disulfonate |
| 47 | 0.075% disulfonate<br>0.075% alkoxylated C6-C16 alcohol |
| 48 | 0.0625% disulfonate<br>0.0875% alkoxylated C6-C16 alcohol |
| 49 | 0.055% disulfonate<br>0.095% alkoxylated C6-C16 alcohol |
| 50 | 0.075% disulfonate<br>0.075% alkoxylated C6-C16 alcohol |
| 51 | 1% alkoxylated C6-C16 alcohol<br>0.5% disulfonate |
| 52 | 1% alkoxylated C6-C16 alcohol |
| 53 | 1% alkoxylated C6-C16 alcohol<br>2.25% sulfosuccinate |
| 54 | 0.25% Guerbet alkoxylated carboxylate<br>1% alkoxylated C6-C16 alcohol<br>2.25% sulfosuccinate |
| 55 | 0.25% Guerbet alkoxylated carboxylate<br>1% alkoxylated alkylphenol<br>2.25% sulfosuccinate |
| 56 | 0.25% Guerbet alkoxylated carboxylate<br>1% alkoxylated C6-C16 alcohol |
| 57 | 0.25 Guerbet alkoxylated carboxylate<br>1% alkoxylated alkylphenol |
| 58 | 0.65% carboxylate<br>0.35% alkoxylated C6-C16 alcohol |
| 59 | 0.325% carboxylate<br>0.925% alkoxylated C6-C16 alcohol |
| 60 | 0.25% olefin sulfonate<br>1.0% alkoxylated C6-C16 alcohol |
| 61 | 0.15% olefin sulfonate<br>0.2% Guerbet alkoxylated carboxylate<br>0.92% carboxylate |
| 62 | 0.65% carboxylate<br>0.35% second carboxylate |
| 63 | 0.65% carboxylate<br>0.35% alkoxylated C6-C16 alcohol<br>1% olefin sulfonate |
| 64 | 1% alkoxylated alcohol<br>1% olefin sulfonate |
| 65 | 0.5% alkoxylated alcohol<br>0.5% olefin sulfonate<br>0.25% carboxylate |
| 66 | 0.6% co-solvent<br>0.6% olefin sulfonate |
| 67 | 0.6% co-solvent<br>0.3% disulfonate<br>0.3% olefin sulfonate |
| 68 | 0.6% Guerbet alkoxylated carboxylate<br>0.6% disulfonate |
| 69 | 0.6% co-solvent<br>0.4% disulfonate<br>0.2% olefin sulfonate |
| 70 | 0.5% alkoxylated C6-C16 alcohol<br>0.4% disulfonate<br>0.3% olefin sulfonate |
| 71 | 1% alkoxylated C6-C16 alcohol |
| 72 | 0.9% alkoxylated C6-C16 alcohol<br>0.6% disulfonate |
| 73 | 0.4% alkoxylated C6-C16 alcohol<br>0.35% disulfonate |

-continued

| LPS Injection Fluid | Surfactants and Co-Surfactants in LPS Injection Fluid (in weight percent) |
|---|---|
| | 0.25% olefin sulfonate<br>0.5% co-solvent |
| 74 | 0.25% Guerbet alkoxylated carboxylate<br>0.5% alkoxylated C6-C16 alcohol<br>0.35% disulfonate<br>0.15% olefin sulfonate<br>0.35% co-solvent |
| 75 | 0.25% Guerbet alkoxylated carboxylate<br>0.25% alkoxylated C6-C16 alcohol<br>0.25% olefin sulfonate<br>0.25% co-solvent |
| 76 | 0.25% Guerbet alkoxylated carboxylate<br>0.25% alkoxylated C6-C16 alcohol<br>0.25% olefin sulfonate<br>0.25% alkoxylated alcohol |
| 77 | 0.25% Guerbet alkoxylated carboxylate<br>0.35% olefin sulfonate<br>0.5% alkoxylated alcohol |
| 78 | 0.25% Guerbet alkoxylated carboxylate<br>0.25% alkoxylated C6-C16 alcohol<br>0.15% olefin sulfonate<br>0.1% disulfonate<br>0.25% co-solvent |
| 79 | 0.25% Guerbet alkoxylated carboxylate<br>0.25% alkoxylated C6-C16 alcohol<br>0.25% olefin sulfonate<br>0.25% glycosides or glucosides<br>0.25% co-solvent<br>0.15% disulfonate |
| 80 | 0.25% Guerbet alkoxylated carboxylate<br>0.25% olefin sulfonate<br>0.5% glycosides or glucosides<br>0.25% co-solvent |
| 81 | 0.15% alkoxylated C12-C22 alcohol |
| 82 | 0.075% alkoxylated C12-C22 alcohol<br>0.075% disulfonate |
| 83 | 0.075% alkoxylated C12-C22 alcohol<br>0.075% disulfonate |
| 84 | 0.075% alkoxylated C12-C22 alcohol<br>0.075% alkoxylated C6-C16 Guerbet alcohol |
| 85 | 0.15% alkoxylated C6-C16 Guerbet alcohol |
| 86 | 0.075% alkoxylated C6-C16 Guerbet alcohol<br>0.075% disulfonate |
| 87 | 0.075% alkoxylated C6-C16 Guerbet alcohol<br>0.075% disulfonate<br>0.05% co-solvent |
| 88 | 0.1% alkoxylated C6-C16 alcohol<br>0.05% disulfonate |
| 89 | 1% alkoxylated C6-C16 alcohol<br>0.5% disulfonate |
| 90 | 0.075% alkoxylated C6-C16 Guerbet alcohol<br>0.075% disulfonate |
| 91 | 0.075% alkoxylated C6-C16 Guerbet alcohol<br>0.125% disulfonate |
| 92 | 0.075% alkoxylated C12-C22 alcohol<br>0.125% disulfonate |
| 93 | 0.075% alkoxylated C12-C22 alcohol<br>0.075% disulfonate |
| 94 | 0.075% alkoxylated C6-C16 Guerbet alcohol<br>0.075% disulfonate |
| 95 | 0.1% alkoxylated C6-C16 Guerbet alcohol<br>0.05% disulfonate |
| 96 | 0.075% alkoxylated C6-C16 Guerbet alcohol<br>0.075% disulfonate |
| 97 | 0.075% alkoxylated C6-C16 alcohol<br>0.075% disulfonate |
| 98 | 0.075% alkoxylated C6-C16 Guerbet alcohol<br>0.075% disulfonate |
| 99 | 0.1% alkoxylated C6-C16 alcohol<br>0.05% disulfonate |
| 100 | 0.09% alkoxylated C6-C16 alcohol<br>0.06% disulfonate |
| 101 | 0.1% alkoxylated C6-C16 alcohol<br>0.1% disulfonate<br>0.1% Guerbet alkoxylated carboxylate |

-continued

| LPS Injection Fluid | Surfactants and Co-Surfactants in LPS Injection Fluid (in weight percent) |
|---|---|
| 102 | 0.1% alkoxylated C6-C16 alcohol<br>0.1% disulfonate |
| 103 | 0.65% Guerbet alkoxylated carboxylate<br>0.35% olefin sulfonate<br>0.33% alkoxylated alkylphenol<br>0.5% co-solvent<br>0.25% second co-solvent |
| 104 | 0.075% alkoxylated C6-C16 alcohol<br>0.075% benzenesulfonic acid, decyl(sulfophenoxy)-disodium salt |
| 105 | 0.15% alkoxylated C6-C16 alcohol<br>0.05% benzenesulfonic acid, decyl(sulfophenoxy)-disodium salt |

In some embodiments, the primary surfactant and the one or more secondary surfactants can be added to the aqueous-based injection fluid to form the LPS injection fluid. For example, the primary surfactant and the one or more secondary surfactants can be pre-mixed as components of the single-phase liquid surfactant package. Alternatively, the primary surfactant and the one or more secondary surfactants can be separately combined with (e.g., sequentially added to) the aqueous-based injection fluid to form the LPS injection fluid. In other embodiments, the primary surfactant and/or the one or more secondary surfactants can be added separately or together to an aqueous-based injection fluid when preparing slickwater in a tank. In some embodiments, the primary surfactant and the one or more secondary surfactants can be mixed with one or more additional components prior to combination with the aqueous-based injection fluid.

The one or more surfactants present in the single-phase liquid surfactant package (and ultimately the LPS injection fluid) can be selected to improve hydrocarbon recovery. Specifically, the one or more surfactants can improve hydrocarbon recovery by increasing the aqueous stability of the LPS injection fluid at the temperature and salinity of the reservoir, decreasing the interfacial tension (IFT) of the LPS injection fluid with hydrocarbons in the reservoir, changing (e.g., increasing or decreasing the wettability of the reservoir, or any combination thereof.

In some embodiments, the one or more surfactants in the single-phase liquid surfactant package (and ultimately the LPS injection fluid) can increase the aqueous stability of the LPS injection fluid at the temperature and salinity of the reservoir. Aqueous stable solutions can propagate further into a reservoir upon injection as compared to an injection fluid lacking aqueous stability. In addition, because injected chemicals remain soluble aqueous stable solutions, aqueous stable solutions do not precipitate particulates or phase separate within the formation which may obstruct or hinder fluid flow through the reservoir. As such, injection fluids that exhibit aqueous stability under reservoir conditions can largely eliminate formation damage associated with precipitation of injected chemicals. In this way, hydrocarbon recovery can be facilitated by the one or more surfactants in the single-phase liquid surfactant package.

In some embodiments, the one or more surfactants in the single-phase liquid surfactant package (and ultimately the LPS injection fluid) can decrease the interfacial tension (IFT) of the LPS injection fluid with hydrocarbons in the reservoir. Reducing the IFT can decrease pressure required to drive an aqueous-based injection fluid into the formation matrix. In addition, decreasing the IFT reduces water block during production, facilitating the flow of hydrocarbons from the formation to the wellbore (e.g., facilitating the flow of hydrocarbons back through the fractures and to the wellbore). In this way, hydrocarbon recovery can be facilitated by the one or more surfactants in the single-phase liquid surfactant package.

In some embodiments, the one or more surfactants in the single-phase liquid surfactant package (and ultimately the LPS injection fluid) can change the wettability of the reservoir. In particular, in embodiments where the reservoir is oil-wet or mixed-wet, the one or more surfactants in the single-phase liquid surfactant package (and ultimately the LPS injection fluid) can make the reservoir more water-wet. By increasing the water-wetness of the reservoir, the formation will imbibe injected aqueous-based injection fluid into the formation matrix, leading to a corresponding flow of hydrocarbon from regions within the formation back to the fracture. In this way, hydrocarbon recovery can be facilitated by the one or more surfactants in the single-phase liquid surfactant package.

In some embodiments, the one or more surfactants can improve hydrocarbon recovery by increasing the aqueous stability of the LPS injection fluid at the temperature and salinity of the reservoir and decreasing the interfacial tension (IFT) of the LPS injection fluid with hydrocarbons in the reservoir. In some embodiments, the one or more surfactants can improve hydrocarbon recovery by decreasing the interfacial tension (IFT) of the LPS injection fluid with hydrocarbons in the reservoir and increasing the wettability of the reservoir. In some embodiments, the one or more surfactants can improve hydrocarbon recovery by increasing the aqueous stability of the LPS injection fluid at the temperature and salinity of the reservoir and increasing the wettability of the reservoir. In certain embodiments, the one or more surfactants can improve hydrocarbon recovery by increasing the aqueous stability of the LPS injection fluid at the temperature and salinity of the reservoir, decreasing the interfacial tension (IFT) of the LPS injection fluid with hydrocarbons in the reservoir, and changing the wettability of the reservoir.

Methods

Embodiments for the process for running treatment operations in an unconventional formation with a LPS injection fluid will now be described. The LPS injection fluid can be used during any portion (or during the entirety of) a treatment operation.

In some embodiments, the LPS injection fluid can be used as part of a completion and/or fracturing operation. For example, the LPS injection fluid can be injected into an unconventional subterranean formation to form and/or extend fractures within the formation. In certain embodiments, the fracturing operation can comprise combining a single-phase liquid surfactant package described herein with an aqueous-based injection fluid to form a low particle size injection fluid; and injecting the low particle size injection fluid through a wellbore and into the unconventional subterranean formation at a sufficient pressure and at a sufficient rate to fracture the unconventional subterranean formation. In some embodiments, the wellbore is a hydraulic fracturing wellbore associated with a hydraulic fracturing well, for example, that may have a substantially vertical portion only, or a substantially vertical portion and a substantially horizontal portion below the substantially vertical portion. In some embodiments, the fracturing operation can be performed in a new well (e.g., a well that has not been previously fractured). In other embodiments, the LPS injection fluid can be used in a fracturing operation in an existing well (e.g., in a refracturing operation).

In some embodiments, the method can comprise performing a fracturing operation on a region of the unconventional subterranean formation proximate to a new wellbore. In some embodiments, the method can comprise performing a fracturing operation on a region of the unconventional subterranean formation proximate to an existing wellbore. In some embodiments, the method can comprise performing a refracturing operation on a previously fractured region of the unconventional subterranean formation proximate to a new wellbore. In some embodiments, the method can comprise performing a refracturing operation on a previously fractured region of the unconventional subterranean formation proximate to an existing wellbore. In some embodiments, the method can comprise performing a fracturing operation on a naturally fractured region of the unconventional subterranean formation proximate to a new wellbore (e.g., an infill well). In some embodiments, the method can comprise performing a fracturing operation on a naturally fractured region of the unconventional subterranean formation proximate to an existing wellbore.

In cases where the fracturing method comprises a refracturing methods, the previously fractured region of the unconventional reservoir can have been fractured by any suitable type of fracturing operation. For example, the fracturing operation may include hydraulic fracturing, fracturing using electrodes such as described in U.S. Pat. Nos. 9,890,627, 9,840,898, U.S. Patent Publication No. 2018/0202273, or fracturing with any other available equipment or methodology. In some embodiments, the fracturing operation can further comprise adding a tracer to the low particle size injection fluid prior to introducing the low particle size injection fluid through the wellbore into the unconventional subterranean formation; recovering the tracer from the fluids produced from the unconventional subterranean formation through the wellbore, fluids recovered from a different wellbore in fluid communication with the unconventional subterranean formation, or any combination thereof; and comparing the quantity of tracer recovered from the fluids produced to the quantity of tracer introduced to the low particle size injection fluid. The tracer can comprise a proppant tracer, an oil tracer, a water tracer, or any combination thereof. Example tracers are known in the art, and described, for example, in U.S. Pat. No. 9,914,872 and Ashish Kumar et al., Diagnosing Fracture-Wellbore Connectivity Using Chemical Tracer Flowback Data, URTeC 2902023, July 23-25, 2018, page 1-10, Texas, USA.

The LPS injection fluids can be used at varying points throughout a fracturing operation. For example, the LPS injection fluid can be used as an injection fluid during the first, middle or last part of the fracturing process, or throughout the entire fracturing process. In some embodiments, the fracturing process can include a plurality of stages and/or sub-stages. For example, the fracturing process can involve sequential injection of fluids in different stages, with each of the stages employing a different aqueous-based injection fluid system (e.g., with varying properties such as viscosity, chemical composition, etc.). Example fracturing processes of this type are described, for example, in U.S. Patent Application Publication Nos. 2009/0044945 and 2015/0083420, each of which is hereby incorporated herein by reference in its entirely.

In these embodiments, the LPS injection fluid can be used as an injection fluid (optionally with additional components) during any or all of the stages and/or sub-stages. Stages and/or sub-stages can employ a wide variety of aqueous-based injection fluid systems, including linear gels, crosslinked gels, and friction-reduced water. Linear gel fracturing fluids are formulated with a wide array of different polymers in an aqueous base. Polymers that are commonly used to formulate these linear gels include guar, hydroxypropyl guar (HPG), carboxymethyl HPG (CMHPG), and hydroxyethyl cellulose (HEC). Crosslinked gel fracturing fluids utilize, for example, borate ions to crosslink the hydrated polymers and provide increased viscosity. The polymers most often used in these fluids are guar and HPG. The crosslink obtained by using borate is reversible and is triggered by altering the pH of the fluid system. The reversible characteristic of the crosslink in borate fluids helps them clean up more effectively, resulting in good regained permeability and conductivity. The single-phase liquid surfactant packages described herein can be added to any of these aqueous-based injection fluid systems.

In some embodiments, the single-phase liquid surfactant package can be combined with an aqueous-based injection fluid in a continuous process to form the LPS injection fluid (which is subsequently injected). In other embodiments, the single-phase liquid surfactant package can be intermittently added to an aqueous-based injection fluid, thereby providing the LPS injection fluid only during desired portions of the treatment operation (e.g., during one or more phases or stages of a fracturing operation). For example, the single-phase liquid surfactant package could be added when injecting slickwater, when injecting fracturing fluid with proppant, during an acid wash, or during any combination thereof. In a specific embodiment, the single-phase liquid surfactant package is continuously added to the aqueous injection fluid after acid injection until completion of hydraulic fracturing and completion fluid flow-back. When intermittently dosed, the single-phase liquid surfactant package can be added to the aqueous-based injection fluid once an hour, once every 2 hours, once every 4 hours, once every 5 hours, once every 6 hours, twice a day, once a day, or once every other day, for example. In some embodiments when used in a fracturing operation, the low particle size injection fluid can have a total surfactant concentration of from 0.01% to 1% by weight, based on the total weight of the low particle size injection fluid.

In some embodiments, the LPS injection fluid can be used as part of a reservoir stimulation operation. In such operations, the fluid can be injected to alter the wettability of existing fractures within the formation (without further fracturing the formation significantly by either forming new fractures within the formation and/or extending the existing fractures within the formation). In such stimulation operations, no proppant is used, and fluid injection generally occurs at a lower pressure.

In some cases, the existing fractures can be naturally occurring fractures present within a formation. For example, in some embodiments, the formation can comprise naturally fractured carbonate or naturally fractured sandstone. The presence or absence of naturally occurring fractures within a subterranean formation can be assessed using standard methods known in the art, including seismic surveys, geology, outcrops, cores, logging, reservoir characterization including preparing grids, etc.

In some embodiments, methods for stimulating an unconventional subterranean formation with a fluid can comprise introducing a low particle size injection fluid described through a wellbore into the unconventional subterranean formation; allowing the low particle size injection fluid to imbibe into a rock matrix of the unconventional subterranean formation for a period of time; and producing fluids from the unconventional subterranean formation through the wellbore. The low particle size injection fluid can comprise an aqueous based injection fluid and an anionic surfactant comprising a hydrophobic tail comprising from 6 to 60 carbon atoms. The low particle size injection fluid can have a maximum particle size of less than 0.1 micrometers in diameter in particle size distribution measurements performed at a temperature and salinity of the unconventional subterranean formation. In these methods, the same wellbore can be used for both introducing the LPS injection fluid and producing fluids from the unconventional subterranean formation. In these methods, the same wellbore can be used for both introducing the LPS injection fluid and producing fluids from the unconventional subterranean formation. In some embodiments, introduction of the LPS injection fluid can increase the production of hydrocarbons from the same wellbore, from a different wellbore in fluid communication with the unconventional subterranean formation, or any combination thereof.

In some embodiments, the stimulation operation can further comprise preparing the LPS injection fluid. For example, in some embodiments, the stimulation operation can further comprise combining a single-phase liquid surfactant package described herein with an aqueous-based injection fluid to form a low particle size injection fluid.

In some embodiments when used in a stimulation operation, the low particle size injection fluid can have a total surfactant concentration of from 0.2% to 5% by weight, based on the total weight of the low particle size injection fluid.

In some embodiments, introducing a low particle size injection fluid described through a wellbore into the unconventional subterranean formation can comprise injecting the low particle size injection fluid through the wellbore and into the unconventional subterranean formation at a sufficient pressure and at a sufficient rate to stimulate hydrocarbon production from naturally occurring fractures in the unconventional subterranean formation.

The low particle size injection fluid can be allowed to imbibe into the rock matrix of the unconventional subterranean formation for varying periods of time depending on the nature of the rock matrix. In some examples, the low particle size injection fluid can be allowed to imbibe into the rock matrix of the unconventional subterranean formation for at least one day (e.g., at least two days, at least three days, at least four days, at least five days, at least six days, at least one week, at least two weeks, at least three weeks, at least one month, at least two months, at least three months, at least four months, or at least five months). In some examples, the low particle size injection fluid can be allowed to imbibe into the rock matrix of the unconventional subterranean formation for six months or less (e.g., five months or less, four months or less, three months or less, two months or less, one month or less, three weeks or less, two weeks or less, one week or less, six days or less, five days or less, four days or less, three days or less, or two days or less).

The low particle size injection fluid can be allowed to imbibe into the rock matrix of the unconventional subterranean formation for varying periods of time depending on the nature of the rock matrix. The imbibing can occur during the introducing step, between the introducing and producing step, or any combination thereof. In some examples, the low particle size injection fluid can be allowed to imbibe into the rock matrix of the unconventional subterranean formation for at least one day (e.g., at least two days, at least three days, at least four days, at least five days, at least six days, at least one week, at least two weeks, at least three weeks, at least one month, at least two months, at least three months, at least four months, or at least five months). In some examples, the low particle size injection fluid can be allowed to imbibe into the rock matrix of the unconventional subterranean formation for six months or less (e.g., five months or less, four months or less, three months or less, two months or less, one month or less, three weeks or less, two weeks or less, one week or less, six days or less, five days or less, four days or less, three days or less, or two days or less).

In some embodiments, the wellbore used in the stimulation operation may have a substantially vertical portion only, or a substantially vertical portion and a substantially horizontal portion below the substantially vertical portion.

In some embodiments, the stimulation methods described herein can comprise stimulating a naturally fractured region of the unconventional subterranean formation proximate to a new wellbore (e.g., an infill well). In some embodiments, the stimulation methods described herein can comprise stimulating a naturally fractured region of the unconventional subterranean formation proximate to an existing wellbore.

In some embodiments, the stimulation methods described herein can comprise stimulating a previously fractured or previously refractured region of the unconventional subterranean formation proximate to a new wellbore (e.g., an infill well). In some embodiments, the stimulation methods described herein can comprise stimulating a previously fractured or previously refractured region of the unconventional subterranean formation proximate to an existing wellbore.

The previous fracturing operation may include hydraulic fracturing, fracturing using electrodes such as described in U.S. Pat. Nos. 9,890,627, 9,840,898, U.S. Patent Publication No. 2018/0202273, or fracturing with any other available equipment or methodology. The previous refracturing operation may include hydraulic fracturing, fracturing using electrodes such as described in U.S. Pat. Nos. 9,890,627, 9,840,898, U.S. Patent Publication No. 2018/0202273, or refracturing with any other available equipment or methodology. In some embodiments, after a formation that has fractures, such as naturally occurring factures, fractures from a fracture operation, fractures from a refracturing operation, or any combination thereof, the fractured formation may be stimulated. For example, a formation may be stimulated after a sufficient amount of time has passed since the fracturing operation with electrodes or refracturing operation with electrodes occurred in that formation so that the electrical pulses utilized to fracture or refracture that formation do not substantially affect the LPS injection fluid.

In some embodiments, the stimulation operation can further comprise adding a tracer to the low particle size injection fluid prior to introducing the low particle size injection fluid through the wellbore into the unconventional subterranean formation; recovering the tracer from the fluids produced from the unconventional subterranean formation through the wellbore, fluids recovered from a different wellbore in fluid communication with the unconventional subterranean formation, or any combination thereof; and comparing the quantity of tracer recovered from the fluids produced to the quantity of tracer introduced to the low particle size injection fluid. The tracer can be any suitable tracer, such as a water tracer or an oil tracer.

Single-phase liquid surfactant packages (as well as the resulting LPS injection fluids) can be optimized for each unconventional reservoir and/or for the type of aqueous-based injection fluid. For example, a single-phase liquid surfactant package can be tested at a specific reservoir temperature and salinity, and with a specific aqueous-based injection fluid. Actual native reservoir fluids may also be used to test the compositions. In an embodiment, the single-phase liquid surfactant package is tested by determining the mean particle size distribution through dynamic light scattering. In specific embodiments, the mean particle size distribution of the aqueous-based injection fluid decreases after addition of the single-phase liquid surfactant package. In embodiments, the average diameter of particle size of the LPS injection fluid (aqueous-based injection fluid plus single-phase liquid surfactant package) is less than 0.1 micrometers. In an embodiment, when tested at the specific reservoir temperature and salinity, the average diameter of the LPS injection fluid is less than 0.1 micrometers. In specific embodiments, the average diameter in particle size distribution measurement of the LPS injection fluid is less than the average pore size of the unconventional reservoir rock matrix.

In some embodiments, the unconventional subterranean formation can have a temperature of at least 75° F. (e.g., at least 80° F., at least 85° F., at least 90° F., at least 95° F., at least 100° F., at least 105° F., at least 110° F., at least 115° F., at least 120° F., at least 125° F., at least 130° F., at least 135° F., at least 140° F., at least 145° F., at least 150° F., at least 155° F., at least 160° F., at least 165° F., at least 170° F., at least 175° F., at least 180° F., at least 190° F., at least 200° F., at least 205° F., at least 210° F., at least 215° F., at least 220° F., at least 225° F., at least 230° F., at least 235° F., at least 240° F., at least 245° F., at least 250° F., at least 255° F., at least 260° F., at least 265° F., at least 270° F., at least 275° F., at least 280° F., at least 285° F., at least 290° F., at least 295° F., at least 300° F., at least 305° F., at least 310° F., at least 315° F., at least 320° F., at least 325° F., at least 330° F., at least 335° F., at least 340° F., or at least 345° F.). In some embodiments, the unconventional subterranean formation can have a temperature of 350° F. or less (e.g., 345° F. or less, 340° F. or less, 335° F. or less, 330° F. or less, 325° F. or less, 320° F. or less, 315° F. or less, 310° F. or less, 305° F. or less, 300° F. or less, 295° F. or less, 290° F. or less, 285° F. or less, 280° F. or less, 275° F. or less, 270° F. or less, 265° F. or less, 260° F. or less, 255° F. or less, 250° F. or less, 245° F. or less, 240° F. or less, 235° F. or less, 230° F. or less, 225° F. or less, 220° F. or less, 215° F. or less, 210° F. or less, 205° F. or less, 200° F. or less, 195° F. or less, 190° F. or less, 185° F. or less, 180° F. or less, 175° F. or less, 170° F. or less, 165° F. or less, 160° F. or less, 155° F. or less, 150° F. or less, 145° F. or less, 140° F. or less, 135° F. or less, 130° F. or less, 125° F. or less, 120° F. or less, 115° F. or less, 110° F. or less, 105° F. or less, 100° F. or less, 95° F. or less, 90° F. or less, 85° F. or less, or 80° F. or less).

The unconventional subterranean formation can have a temperature ranging from any of the minimum values described above to any of the maximum values described above. For example, in some embodiments, the unconventional subterranean formation can have a temperature of from 75° F. to 350° F. (approximately 24° C. to 176° C.), from 150° F. to 250° F. (approximately 66° C. to 121° C.), from 110° F. to 350° F. (approximately 43° C. to 176° C.), from 110° F. to 150° F. (approximately 43° C. to 66° C.), from 150° F. to 200° F. (approximately 66° C. to 93° C.), from 200° F. to 250° F. (approximately 93° C. to 121° C.), from 250° F. to 300° F. (approximately 121° C. to 149° C.), from 300° F. to 350° F. (approximately 149° C. to 176° C.), from 110° F. to 240° F. (approximately 43° C. to 116° C.), or from 240° F. to 350° F. (approximately 116° C. to 176° C.).

In some embodiments, the salinity of unconventional subterranean formation can be at least 5,000 ppm TDS (e.g., at least 25,000 ppm TDS, at least 50,000 ppm TDS, at least 75,000 ppm TDS, at least 100,000 ppm TDS, at least 125,000 ppm TDS, at least 150,000 ppm TDS, at least 175,000 ppm TDS, at least 200,000 ppm TDS, at least 225,000 ppm TDS, at least 250,000 ppm TDS, or at least 275,000 ppm TDS). In some embodiments, the salinity of unconventional subterranean formation can be 300,000 ppm TDS or less (e.g., 275,000 ppm TDS or less, 250,000 ppm TDS or less, 225,000 ppm TDS or less, 200,000 ppm TDS or less, 175,000 ppm TDS or less, 150,000 ppm TDS or less, 125,000 ppm TDS or less, 100,000 ppm TDS or less, 75,000 ppm TDS or less, 50,000 ppm TDS or less, or 25,000 ppm TDS or less).

The salinity of unconventional subterranean formation can range from any of the minimum values described above to any of the maximum values described above. For example, in some embodiments, the salinity of unconventional subterranean formation can be from 5,000 ppm TDS to 300,000 ppm TDS (e.g., from 100,000 ppm to 300,000 ppm TDS).

In some embodiments, the unconventional subterranean formation can be oil-wet. In some embodiments, the unconventional subterranean formation can be water-wet. In some embodiments, the unconventional subterranean formation can be mixed-wet.

In some embodiments, the LPS injection fluid can be introduced at a wellhead pressure of at least 0 PSI (e.g., at least 1,000 PSI, at least 2,000 PSI, at least 3,000 PSI, at least 4,000 PSI, at least 5,000 PSI, at least 6,000 PSI, at least 7,000 PSI, at least 8,000 PSI, at least 9,000 PSI, at least 10,000 PSI, at least 15,000 PSI, at least 20,000 PSI, or at least 25,000 PSI). In some embodiments, the LPS injection fluid can be introduced at a wellhead pressure of 30,000 PSI or less (e.g., 25,000 PSI or less, 20,000 PSI or less, 15,000 PSI or less, 10,000 PSI or less, 9,000 PSI or less, 8,000 PSI or less, 7,000 PSI or less, 6,000 PSI or less, 5,000 PSI or less, 4,000 PSI or less, 3,000 PSI or less, 2,000 PSI or less, or 1,000 PSI or less).

The LPS injection fluid can be introduced at a wellhead pressure ranging from any of the minimum values described above to any of the maximum values described above. For example, in some embodiments, the LPS injection fluid can be introduced at a wellhead pressure of from 0 PSI to 30,000 PSI (e.g., from 6,000 PSI to 30,000 PSI, or from 5,000 PSI to 10,000 PSI. In some embodiments, the LPS fluid can be used in a reservoir stimulation operation, and the LPS injection fluid can be introduced at a wellhead pressure of from 0 PSI to 1,000 PSI.

Example embodiments of using a LPS injection fluid in a wellbore will be described more fully hereinafter with reference to the accompanying drawings, in which example embodiments of injecting an LPS injection fluid into a wellbore are shown. The injection, however, may be embodied in many different forms and should not be construed as limited to the example embodiments set forth herein. Rather, these example embodiments are provided so that this disclosure will be thorough and complete, and will fully convey the scope of injecting an LPS injection fluid into an unconventional reservoir to those of ordinary skill in the art. Like, but not necessarily the same, elements in the various figures are denoted by like reference numerals for consistency.

Figure 1C:
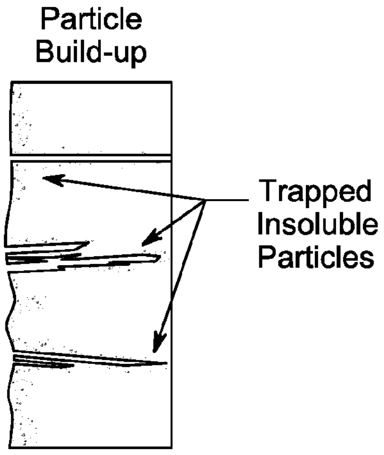
Figure 2A:
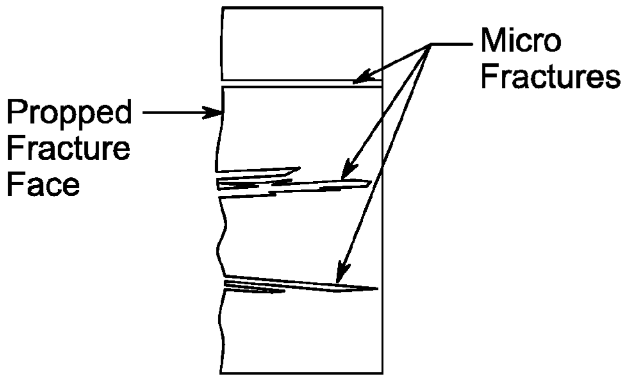
FIGS. 2A-2C illustrate injection of low particle size injection fluids in a portion of an unconventional reservoir.
Figure 2B:
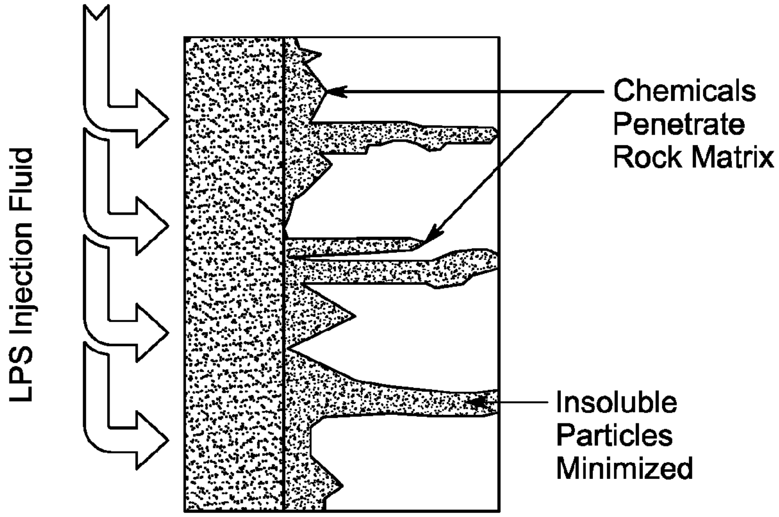
Figure 2C:
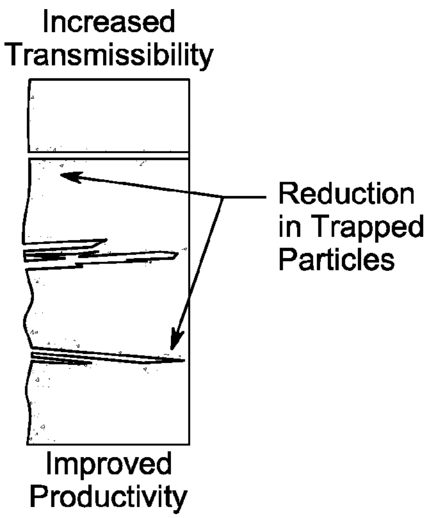

FIGS. 2A-2C illustrate an example injection using the LPS injection fluid of the disclosure. A single-phase liquid surfactant package is mixed into an aqueous-based injection fluid prior to injection into a portion of an unconventional reservoir forming a LPS injection fluid. The LPS injection fluid is then pumped into a well under pressure such that the LPS injection fluid penetrates the rock matrix (FIG. 2A prior to injection, FIG. 2B after injection). Because the LPS injection fluid does not precipitate out when inside the unconventional reservoir, insoluble particles are minimized. After fracturing or stimulating the reservoir there is increased transmissibility and improved productivity due to less damage from trapped particles that precipitated out of solution (FIG. 2C) than would be encountered in reservoirs treated with prior art injection fluids (FIG. 1C). Furthermore, in some embodiments, the LPS injection fluid penetrates deeper into the formation rock matrix compared to prior injection fluids due to the addition of the single-phase liquid surfactant package.

Figure 3A:
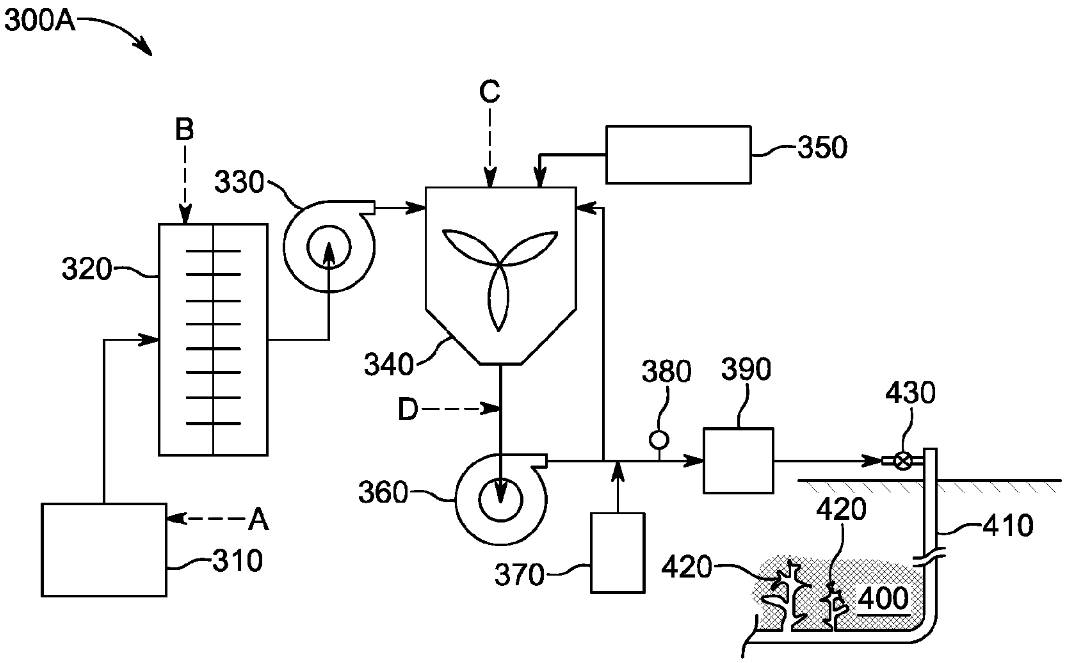
FIG. 3A is a schematic illustration of methods of preparing low particle size injection fluids using the single-phase liquid surfactant packages described herein. The system includes a conventional surface blending system to accommodate the preparation of low particle size injection fluids for use in a variety of operations, including fracturing operations (e.g., fracturing a formation that was not previously fractured such as hydraulically fracturing a formation for the first time) and refracturing operations (e.g., fracturing a formation that was previously fractured such as hydraulically fracturing a formation a subsequent time). The system may also be used for completion of new wells.

FIG. 3A is a schematic illustration of system and method 300A for preparing LPS injection fluids for use in a variety of operations, including the fracturing and/or completion of new wells using single-phase liquid surfactant packages. Aqueous based injection fluid is provided at unit 310. Unit 310 can be any means for providing sufficient amounts of aqueous based injection fluid, e.g., for a hydraulic fracturing operation. In some embodiments, unit 310 comprises multiple portable storage units (commonly referred to as "frac tanks"). Each frac tank holds approximately 20,000 gallons of aqueous based injection fluid and are delivered via truck trailer. Aqueous based injection fluid is supplied to a gel hydration unit 320 to mix and hydrate polymer. Gel hydration unit 320 is often partitioned into a plurality of hydration sections to ensure complete hydration of the polymer. Pump 330 pumps the aqueous based injection fluid from gel hydration unit 320 to blender 340. Proppant from proppant storage unit 350 can be delivered to blender 340 where it is mixed with the aqueous based injection fluid. The slurry exiting blender 340 can be recirculated via pump 360 back into blender or the aqueous based injection fluid can proceed towards injection.

Various chemicals can be added to the aqueous based injection fluid to increase performance of the fracturing operation. For example, in FIG. 3A, a biocide is added to aqueous based injection fluid at point A; gelling agent, gelling stabilizers and buffers, scale inhibitor and biocide are added at point B; friction reducer, a breaker, and surfactant buffer are added at point C; and a crosslinker is added at point D. In other embodiments, these chemicals—or other chemicals such as an acid, a pH adjusting agent, a non-emulsifier agent, a scale inhibitor, an iron control agent, a corrosion inhibitor, a clay stabilizing agent, a proppant, or any combination thereof—can be introduced in different locations to prepare aqueous based injection fluid for injection.

Single-phase liquid surfactant package 370 comprising a primary surfactant is combined with the aqueous based injection fluid after the blender 340 and prior to fracture pump 390 to form a low particle size injection fluid. Combining single-phase liquid surfactant package 370 with the aqueous based injection fluid downstream of the blender 340 helps avoid foaming, which is a common phenomenon encountered in mixing processes as surfactants can cause or exacerbate the foam formation. In alternative embodiments, the single-phase liquid surfactant package 370 can be added upstream of blender 340. Here, the addition of an anti-foam agent (e.g., chemical defoamer) can be applied to destroy and/or avoid foam formation. A sample of the low particle size injection fluid can be taken at sampling unit 380 to confirm low particle size injection fluid meets fluid specifications (e.g., viscosity, aqueous stability, chemical concentrations). The low particle injection fluid is introduced into the unconventional subterranean formation 400 via wellbore 410 after being pressurized by fracture pump 390. Fracture pump 390 is a pumping unit that can deliver the low particle injection fluid into wellbore 410 at sufficient rates and volumes to increase the pressure at a target location (e.g., determined by the location of casing perforations in wellbore 410) such that the pressure exceeds the fracture gradient of the reservoir rock, thereby creating or extending fractures 420 in the rock matrix of unconventional subterranean formation 400. The wellbore 410 can include one or more valves 430 at the wellhead of wellbore 410. Valves 430 can be used to stop fluid flow between wellbore 410 and the high pressure line connecting fracture pump 390. For example, valves 430 can be closed following injection of the pressurized low particle injection fluid into wellbore 410 (e.g., to isolate fluid from flowback as it is produced back up wellbore 410 and is being routed to flowback tank (not shown)).

Figure 3B:
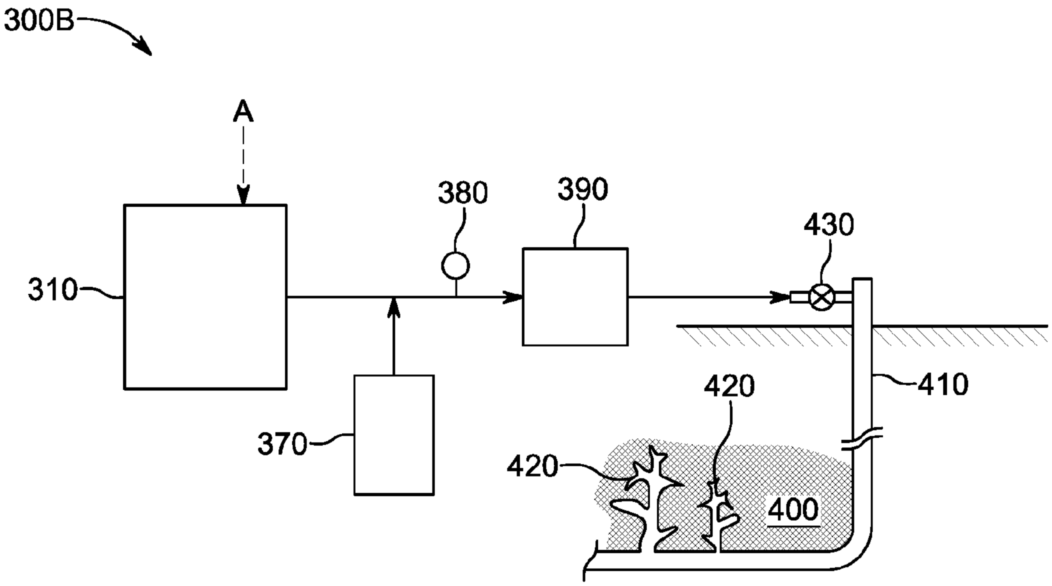
FIG. 3B is a schematic illustration of alternative methods of preparing low particle size injection fluids using the single-phase liquid surfactant packages described herein. The system is simplified for use in the stimulation of a fractured formation with low particle size injection fluids (e.g., naturally fractured formation or formation that has undergone a fracturing operation or formation that has undergone a refracturing operation).

FIG. 3B is a schematic illustration of system and method 300B for preparing LPS injection fluids for use in the stimulation of existing wells (i.e., where fracturing and/or completion of a well has already taken place). Here, the conventional surface blending system used in system and method 300A is not needed for the preparation of LPS. Instead, the process is simplified and single-phase liquid surfactant package 370 comprising a primary surfactant is combined with the aqueous based injection fluid from unit 310 to form a low particle size injection fluid. Various chemicals can be added to the aqueous based injection fluid at point A to increase performance of the stimulation operation. For example, a biocide, a scale inhibitor, a pH adjusting agent, a non-emulsifier agent, an iron control agent, a corrosion inhibitor, or any combination thereof can be added to aqueous based injection fluid at point A. In alternative embodiments, these chemicals can be provided in single-phase liquid surfactant package 370.

EXAMPLES

The invention will be described in greater detail by way of specific examples. The following examples are offered for illustrative purposes, and are not intended to limit the invention in any manner. Those of skill in the art will readily recognize a variety of non-critical parameters which can be changed or modified to yield essentially the same results.

Example 1

As detailed below, three different injection fluid chemistries were utilized: slickwater, an acid spearhead comprising aqueous based injection fluid with 15% hydrochloric (HCl) acid, and an aqueous based injection fluid with linear gel (diluted at 15 lb/Mgal) with a cross-linker. Stages 4-9 of the example fracturing operation also contained a 100 mesh proppant and stages 11-12 utilized a 40/70 mesh curable resin coated (CRC) proppant.

TABLE 1

Stages of an example fracturing operation.

| Stage | Aqueous-Based Injection Fluid | Proppant | Pump Rate (bpm) | Pump Time (min) |
|---|---|---|---|---|
| 1 | Slickwater | — | 5 | 2.4 |
| 2 | 15% HCl Acid | — | 15 | 3.2 |
| 3 | Slickwater | — | 40 | 7.7 |
| 4 | Slickwater | 100 mesh | 80 | 7.0 |
| 5 | Slickwater | 100 mesh | 80 | 8.6 |
| 6 | Slickwater | 100 mesh | 80 | 12.4 |
| 7 | Slickwater | 100 mesh | 85 | 14.5 |
| 8 | Slickwater | 100 mesh | 85 | 14.7 |
| 9 | Slickwater | 100 mesh | 85 | 13.6 |
| 10 | 15# Linear Gel | 100 mesh | 85 | 13.8 |
| 11 | 15# Linear Gel | 40/70 CRC | 85 | 7.3 |
| 12 | 15# Linear Gel | 40/70 CRC | 85 | 16.4 |
| 13 | 15# Linear Gel | | 85 | 0.6 |
| 14 | Slickwater | | 85 | 3.1 |

A schematic illustration of the method for preparing injection fluids with single-phase liquid surfactant packages is shown in FIG. 3A. Briefly, the aqueous-based injection fluids were prepared conventionally and additional materials (e.g., gelling agent, proppant) were mixed with the aqueous-based injection fluids in a blender. The single-phase liquid surfactant package was added to the aqueous-based injection fluids downstream of the blending unit to form the LPS injection fluid. Once formed, the LPS injection fluid can be pressurized and introduced through a wellbore and into the unconventional reservoir.

Sampling of injection fluids used as the aqueous base fluid in this example were conducted just downstream of the blending unit. Other than from the low pressure side of the frac-manifold, this is the last location in which samples could be collected at low pressure (approximately 100 PSI) before being charged to over 8,000 PSI. Injection fluid samples were taken from a sampling line connected to the discharge manifold of the blending unit. The primary components of the test setup were a hot-water bath, thermocouple with digital readout, scale, stirplate and filtration apparatus.

Different single-phase liquid surfactant packages were tested for compatibility against the treatment schedule of a fracture completion in an example unconventional reservoir. To characterize compatibility required testing three different injection fluid chemistries: slickwater; a low-polymer, borate-crosslinked fracturing fluid including a sand-based proppant; and an acid spearhead comprising an aqueous based injection fluid with 15% hydrochloric (HCl) acid.

Prescreening for slickwater compatibility. The first set of prescreening experiments was performed using slickwater from the fourth sub-stage of a completion. The constituents of the fluid sample collected included: a friction reducing polymer transported in emulsion form, a surfactant/solvent mixture to prevent emulsion formation, and field injection water (approximately 7,500 ppm via refractometry). The slickwater sample had the consistency of water and an opaque appearance. This fluid was not aqueous stable at ambient conditions and also proved to be unstable at reservoir temperature (approximately 75° C. or 167° F.).

Different single-phase liquid surfactant packages were added to the slickwater sample at prescribed concentrations and heated in a water bath to 75° C. (167° F.). Temperature was set and displayed on the water bath and was confirmed using a thermocouple with digital readout.

Figure 4:
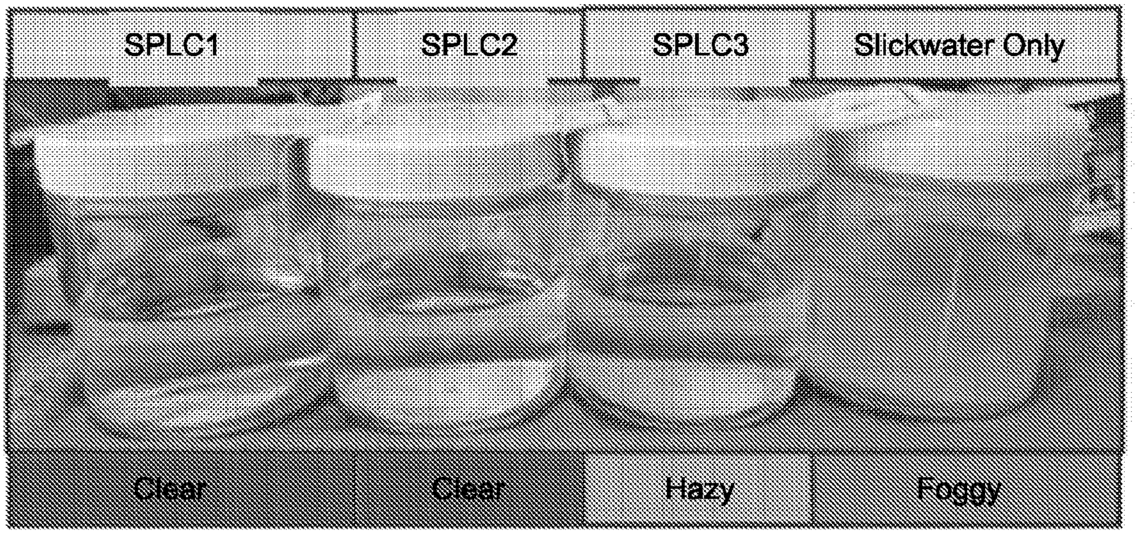
FIG. 4 is a photograph of four containers with, from left to right, slickwater and a single-phase liquid surfactant package (SPLC1), slickwater and a second single-phase liquid surfactant package (SPLC2), slickwater and a third single-phase liquid surfactant package (SPLC3), and slickwater only.
Figure 11:
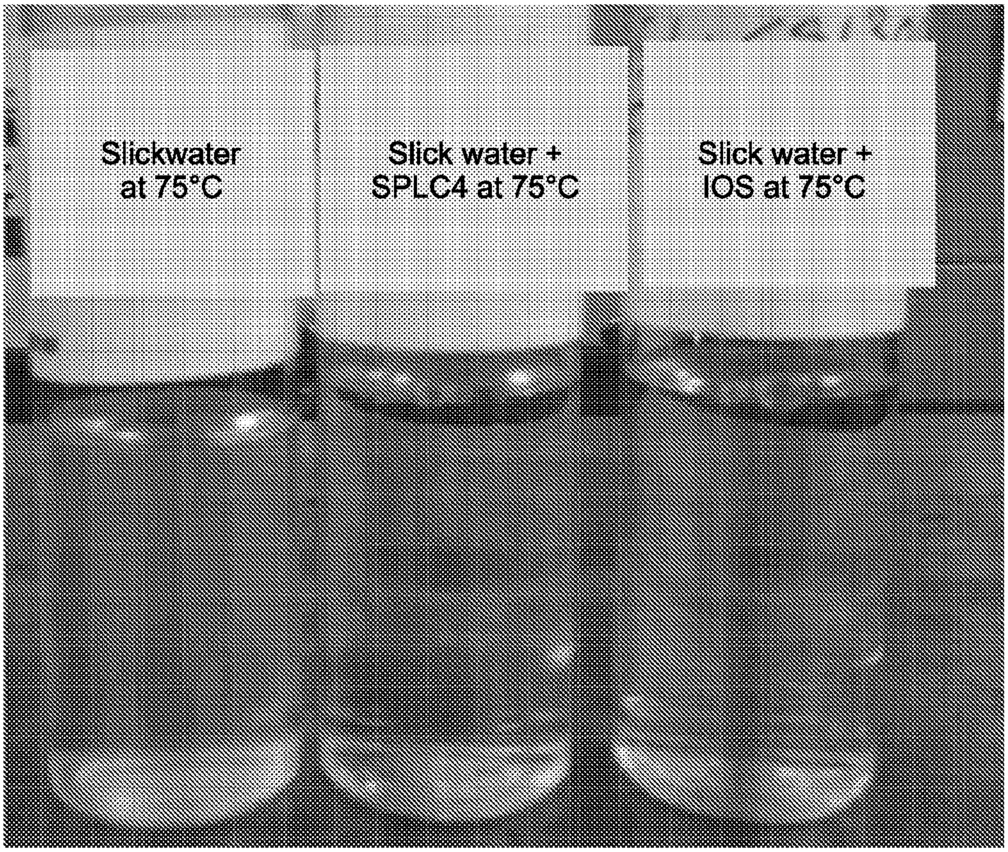
FIG. 11 is a photograph of three containers with, from left to right, slickwater only, slickwater and a single-phase liquid surfactant package (SPLC4), and slickwater and internal olefin sulfonate (IOS).

Three single-phase liquid surfactant packages enhanced the clarity of the unfiltered slickwater sample at reservoir temperature (shown in FIG. 4, from left to right: SPLC1, SPLC2, SPLC3, and slickwater only). The SPLC1 formulation showed superior performance relative to the sample group. SPLC2 also showed excellent performance. SPLC3 showed the next best performance. The SPLC3 formulation was slightly hazy and its performance was likely boosted due to a higher dilution ratio than the other samples tested. The SPLC1, 2 and 3 formulations contained disulfonates as anionic surfactant. A single-phase liquid surfactant package (SPLC4) with internal olefin sulfonate also successfully clarified unfiltered slickwater at reservoir temperature (FIG. 11).

TABLE 2

Composition of four example single-phase liquid surfactant packages evaluated herein.

| Formation | Additives (wt % desired in injection fluid) |
|---|---|
| SPLC1 | C9-11 ethoxylated alcohol (1%)<br>benzenesulfonic acid, decyl(sulfophenoxy)-disodium salt (0.5%) |
| SPLC2 | C9-11 ethoxylated alcohol (0.75%)<br>benzenesulfonic acid, decyl(sulfophenoxy)-disodium salt (0.75%) |
| SPLC3 | Cl2-14 secondary ethoxylated alcohol (0.75%),<br>benzenesulfonic acid, decyl(sulfophenoxy)-disodium salt (0.75%) |
| SPLC4 | C12-14 secondary ethoxylated alcohol (0.075%)<br>C16-18 Internal olefin Sulfonate (IOS) (0.075%) |

Embodiments of the ethoxylated alcohols tested in these examples ranged from 8-20 EO groups. However, in embodiments of the disclosure, ethoxylated alcohols could range from 1-100 EO groups.

Figure 5:
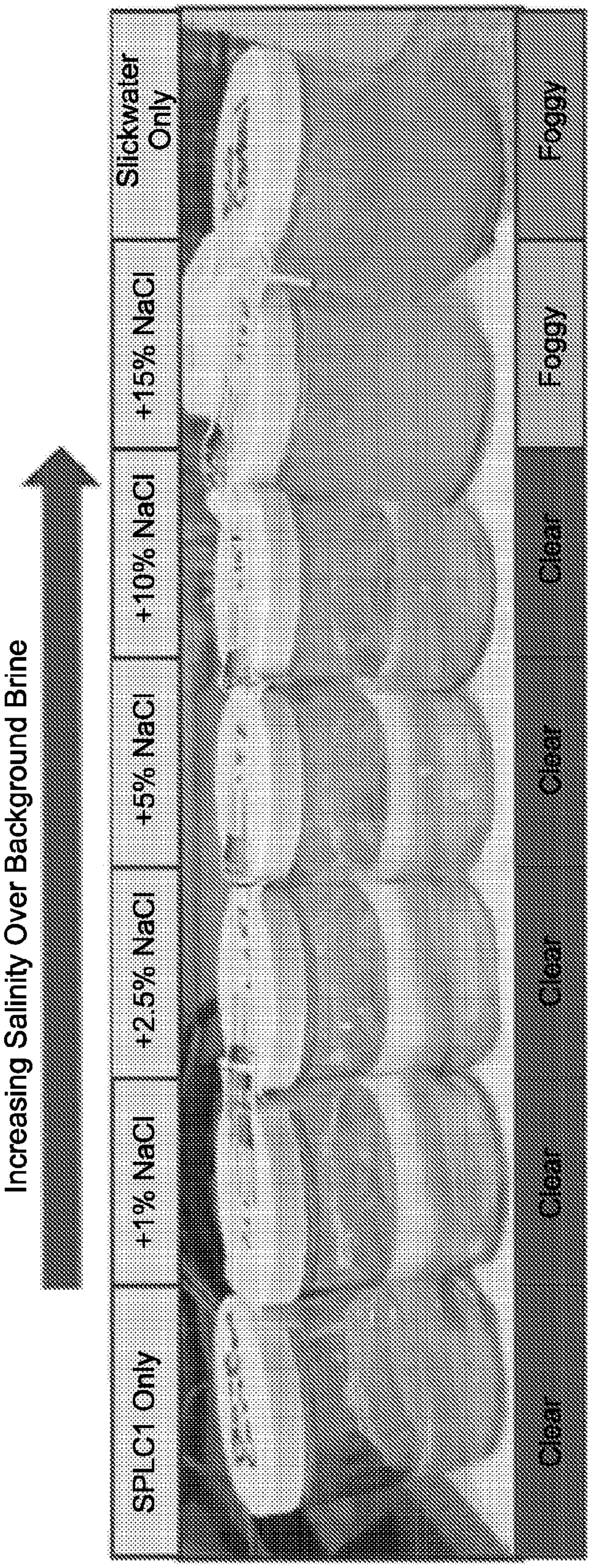
FIG. 5 is a photograph of containers with increasing salinity over background brine using slickwater and a single-phase liquid surfactant package (SPLC1) in, from left to right, SPLC1 only, +1% NaCl, +2.5% NaCl, +5% NaCl, +10% NaCl, +15% NaCl, and slickwater only.

SPLC1 was tested further for compatibility under increased salinity. As the injection fluid moves down-hole, through fractures and away from the wellbore, it encounters reservoir brine. This occurs during flow-back as well. Formation water salinity can exceed 100,000 ppm TDS. This increased salinity challenges aqueous stability. Experiments were conducted to observe the potential impact of increased salinity on SPLC1. Sodium chloride (NaCl) was added to unfiltered slickwater samples containing SPLC1 at its prescribed concentration and then heated to 75° C. (167° F.). The results of this sensitivity experiment are shown below in FIG. 5.

The SPLC1 composition proved quite resilient. Even when 100,000 ppm NaCl (+10 wt % NaCl) was added to the solution, bringing the TDS of the solution to 107,500 ppm, the SPLC1 remained aqueous stable at 75° C. (167° F.). Somewhere between 107,500 ppm (+10 wt % NaCl) and 157,500 ppm (+15 wt % NaCl), aqueous stability was lost and the solution became foggy in appearance. As a side note, cooling the 157,500 ppm sample (+15 wt % NaCl) down to 61° C. (142° F.) returned the sample's aqueous stability.

Figure 6:
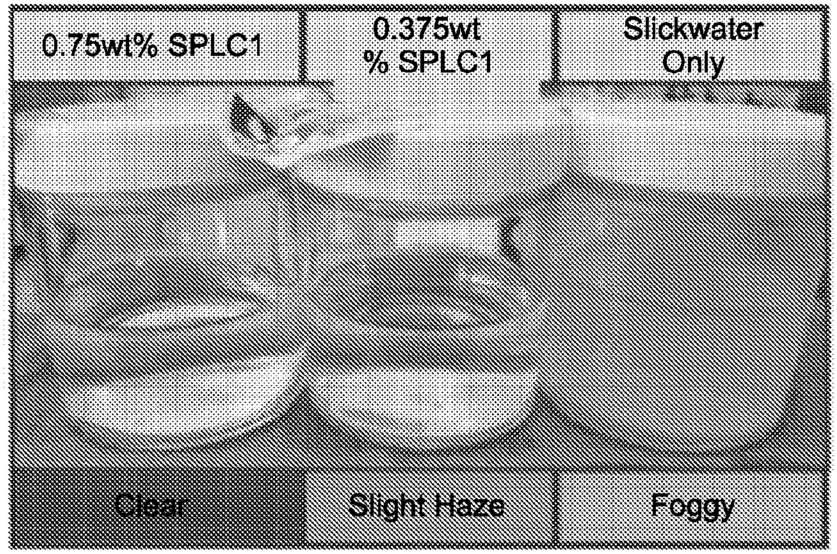
FIG. 6 is a photograph of three containers comprising different concentrations of a single-phase liquid surfactant package (SPLC1), from left to right, 0.75 wt % SPLC1, 0.375 wt % SPLC1, and slickwater only tested at 75° C. (167° F.).

The SPLC1 formulation was tested further to investigate how aqueous stability held up when the prescribed chemical package concentration was reduced. The results of this experiment are shown in FIG. 6. SPLC1 was diluted to 0.750 wt % and 0.375 wt % in unfiltered slickwater. At 0.750 wt %, SPLC1 remained aqueous stable. A slight haze developed when the SPLC1 concentration was reduced to 0.375 wt %.

Gel and Cross-linker Compatibility. The next water chemistry prescreened was an injection fluid whose primary additive constituents were gelling agent (HPAM) and cross-linker. A detailed constituent list follows:

Petroleum distillates, Gelling Agent

Non-Emulsifier Agent

Ammonium Persulfate, Breaker

Boric acid with ethylene glycol and monoethanolamine, Crosslinker pH Adjusting Agent Field Injection Water (approximately 7,500 ppm via refractometry)

30/50 mesh (300 μm-600 μm) White Sand, Proppant

Figure 7:
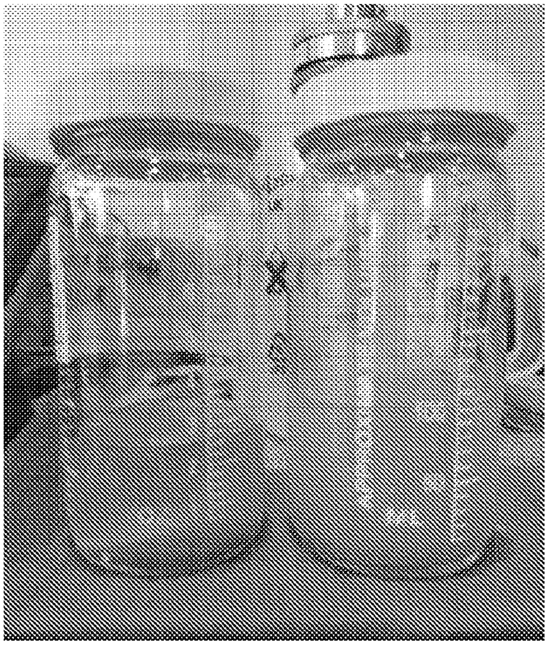
FIG. 7 is a photograph of two containers, from left to right, comprising a mixture of a single-phase liquid surfactant package (SPLC1) and an injection fluid comprising sand at 75° C. (167° F.), and an injection fluid comprising sand only tested at 75° C. (167° F.).

Conducting compatibility and aqueous stability tests with the fracturing fluid proved very challenging. The sample was extremely viscous, containing sand, polymer and an active crosslinker. A photograph of the sample collected is shown below in FIG. 7. Due to its viscosity and the fact that polymer contained in the sample was actively being cross-linked, the sample could not be filtered. Testing with unfiltered fracturing fluid was conducted using the leading single-phase liquid surfactant packages previously identified from slickwater compatibility testing.

Despite the presence of degrading polymer, the procedure for prescreening the single-phase liquid surfactant packages proved fruitful. The SPLC1 formulation clarified the fracturing fluid sample to some degree over the control.

15% HCl Acid Compatibility. The last injection fluid chemistry prescreened was the 15% HCl Acid spearhead. Each fracture completion stage is typically initiated with an acid spearhead to assist in breaking down the formation. The acid spearhead contains the following components:

15% HCl Acid

Scale, corrosion, and biological inhibitors

Acetic acid, Iron Control Agent

Citric acid, Iron Control Agent

Non-Emulsifier Agent

Field Injection Water (approximately 7,500 ppm via refractometry)

The purpose of this testing was to determine whether the SPLC would dropout or cause precipitation in the acid spearhead. Should this occur, in embodiments, a bicarbonate buffer could be added to protect the SPLC package from the acid spearhead. If the SPLC chemical package remained stable then the added complexity associated with a buffer solution may not be needed.

HCl is delivered on-site at a 20% concentration and injected at a 15% concentration. This means that upon injection, the HCl is only slightly diluted with field brine. This results in a slightly cleaner, but still not aqueous stable, injection fluid. The pH was tested at about 1 pH. This extremely low pH could ultimately break apart surfactant molecules.

Figure 13:
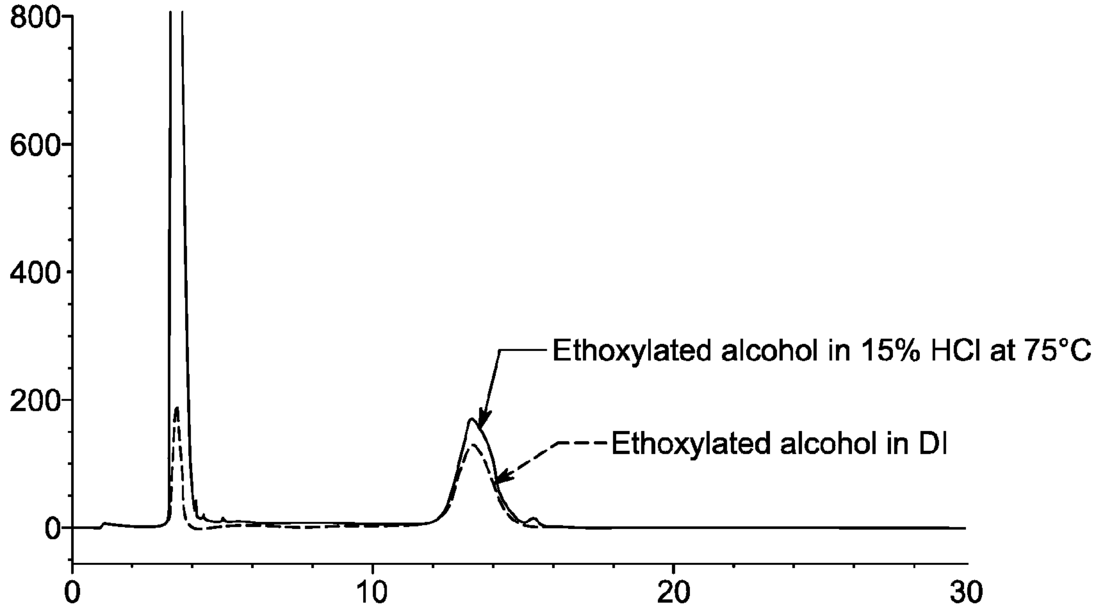
FIG. 13 is an overlay profile of high-performance liquid chromatography (HPLC) for ethoxylated alcohol in deionized (DI) water and 15% hydrochloric acid (HCL) after being heated 3 days at 75° C. (167° F.).

The most fragile surfactant in SPLC1 formulation is ethoxylated alcohols. An ethoxylated alcohol was added to the 15% HCl Acid at its prescribed concentration. The sample was then heated to 75° C. (167° F.). After heating for 3 days, the chemical stability of the surfactant was tested using high-performance liquid chromatography (HPLC) and it showed that there was not significant surfactant degradation with 15% HCl (FIG. 13).

The SPLC1 formulation exhibited superior performance when prescreened relative to the dozens of engineered chemical packages, additives and combinations thereof that were tested for field injection fluids compatibility and aqueous stability. These compatibility tests were performed for three injection water chemistries present during a fracturing operation. Additional sensitivity studies of the SPLC1 formulation revealed aqueous stability in excess of 107,500 ppm TDS in Slickwater. Compatibility testing in a fracturing fluid showed promising results for the SPLC1 formulation. HPLC data showed that ethoxylated alcohol in SPLC1 formulation is chemical stable in 15% HCl Acid at elevated temperature. SPLC's stability in acid eliminates the need for a buffer solution which simplifies piloting operations. Further sensitivity of the SPLC1 formulation showed aqueous stability at concentrations below 0.750%.

Example 2

The particle size distribution of injection fluids was measured with a laser diffraction particle size analyzer (Horiba la 300, minimum measurement of 0.1 μm diameter). Slickwater and slickwater plus different amounts of anionic surfactant and/or non-ionic surfactants were measured after mixing and resting overnight at 75° C. (167° F.).

Figure 8:
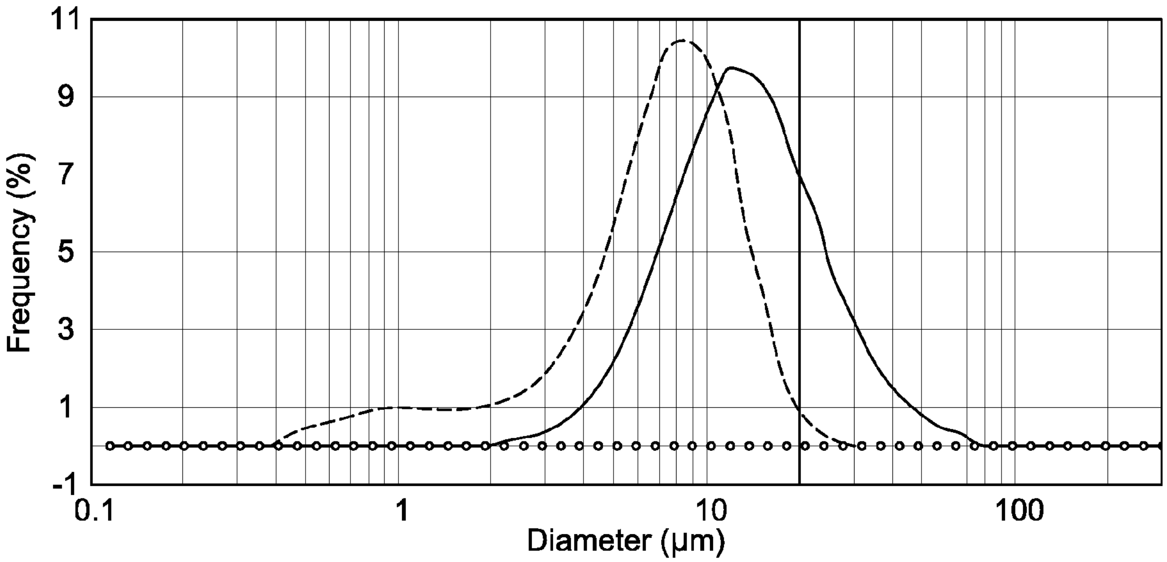
FIG. 8 is the particle size distribution of slickwater only (solid line) and slickwater plus a C9-11 ethoxylated alcohol surfactant (dashed line), and slickwater plus benzenesulfonic acid, decyl(sulfophenoxy)-disodium salt (dotted line).

FIG. 8 shows the particle size measurement of the field slickwater only sample (solid line with average particle size diameter around 13 μm); field slickwater plus 0.1% C9-11 ethoxylated alcohol (non-ionic surfactant) (dashed line with average particle size diameter around 8.0 μm); and field slickwater plus 0.05% benzenesulfonic acid, decyl(Sulfophenoxy)-disodium salt (anionic surfactant; solid line straight through 0 μm indicating a particle size of the solution is less than the minimum measurement of 0.1 μm diameter of the instrument). The slickwater plus anionic surfactant sample had no particle sizes with a diameter higher than 0.1 μm, which is the smallest diameter the instrument could measure.

Figure 9:
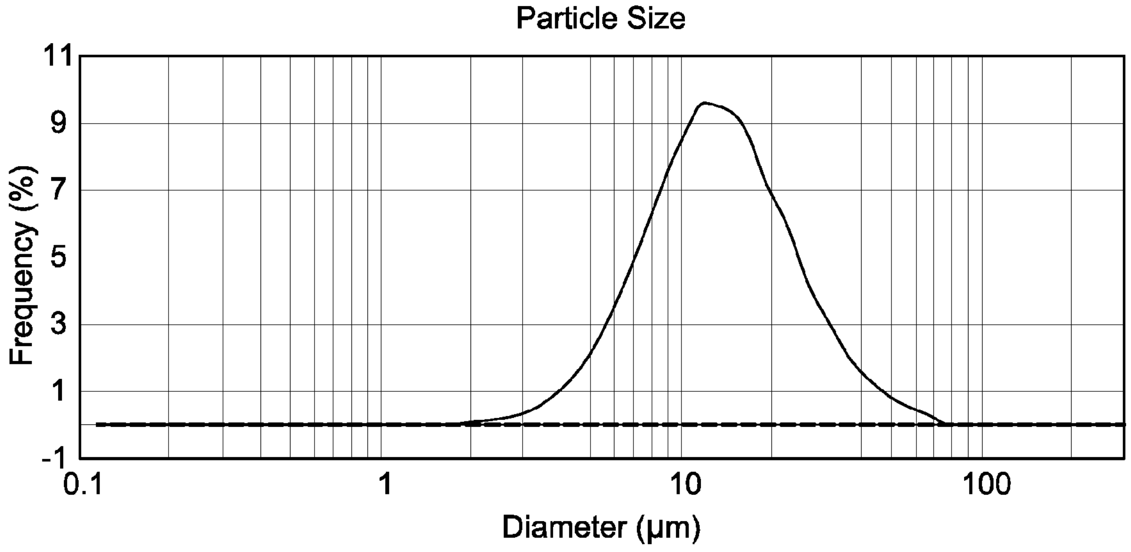
FIG. 9 is the particle size distribution of slickwater only (solid curved line), slickwater plus benzenesulfonic acid, decyl(sulfophenoxy)-disodium salt and a Guerbet C10 ethoxylated alcohol surfactant (dotted straight line), and slickwater plus benzenesulfonic acid, decyl(sulfophenoxy)-disodium salt and a C9-11 ethoxylated alcohol surfactant (dashed straight line having the same frequency value and being coincident with the dashed straight line for the version with the Guerbet non-ionic surfactant).

FIG. 9 shows the particle size measurement of the field slickwater only sample (solid line with average particle size around 13 μm); field slickwater plus 0.1% C9-11 ethoxylated alcohol and 0.05% benzenesulfonic acid, decyl(Sulfophenoxy)-disodium salt (non-ionic and anionic surfactant; dashed straight line through 0 μm indicating a particle size of the solution is less than the minimum measurement of instrument of 0.1 μm diameter); and field slickwater plus 0.075% Guerbet C10 ethoxylated alcohol and 0.075% benzenesulfonic acid, decyl(Sulfophenoxy)-disodium salt (nonionic and anionic surfactant; dotted line straight through 0 μm indicating a particle size of the solution is less than the minimum measurement of 0.1 μm diameter). Accordingly, both slickwater plus anionic and nonionic surfactant mixtures resulted in a particle size measurements of at least less than 0.1 μm.

Figure 10:
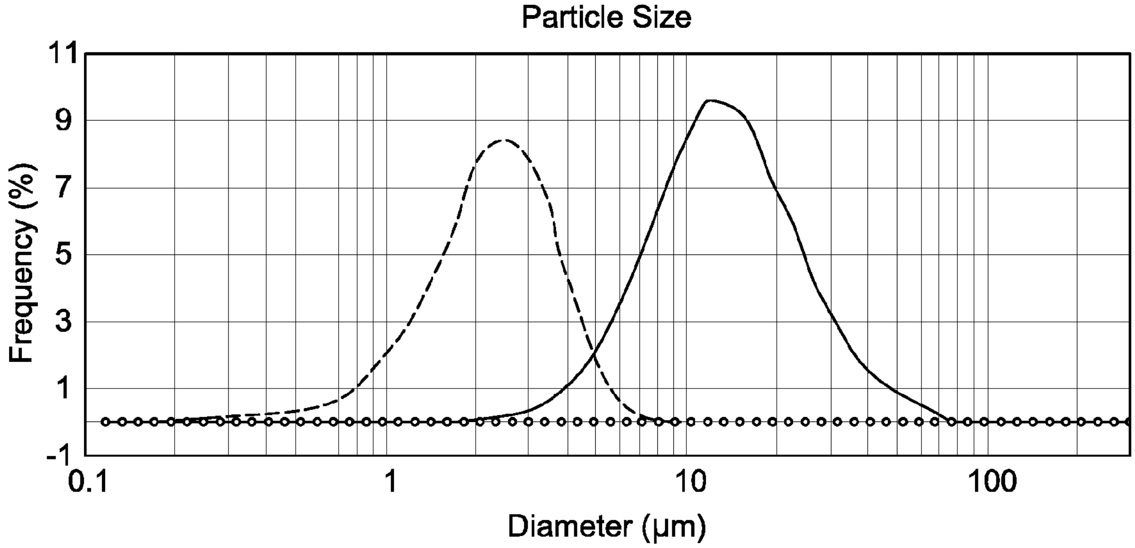
FIG. 10 is the particle size distribution of slickwater only (solid curved line), slickwater plus a Guerbet C10 ethoxylated alcohol surfactant (dashed line), and slickwater plus benzenesulfonic acid, decyl(sulfophenoxy)-disodium salt surfactant (dotted straight line).

FIG. 10 shows the particle size measurement of the field slickwater only sample (solid line with mean particle size around 13 μm), slickwater plus 0.075% Guerbet C10 ethoxylate alcohol (non-ionic surfactant, dashed line with average particle size diameter around 2.5 μm); and field slickwater plus 0.075% benzenesulfonic acid, decyl(Sulfophenoxy)-disodium salt (anionic surfactant; solid line straight through 0 μm indicating a particle size measurement is less than the minimum measurement of 0.1 μm diameter of the instrument). The slickwater plus anionic surfactant sample had no particle sizes with a diameter higher than 0.1 μm.

Figure 12:
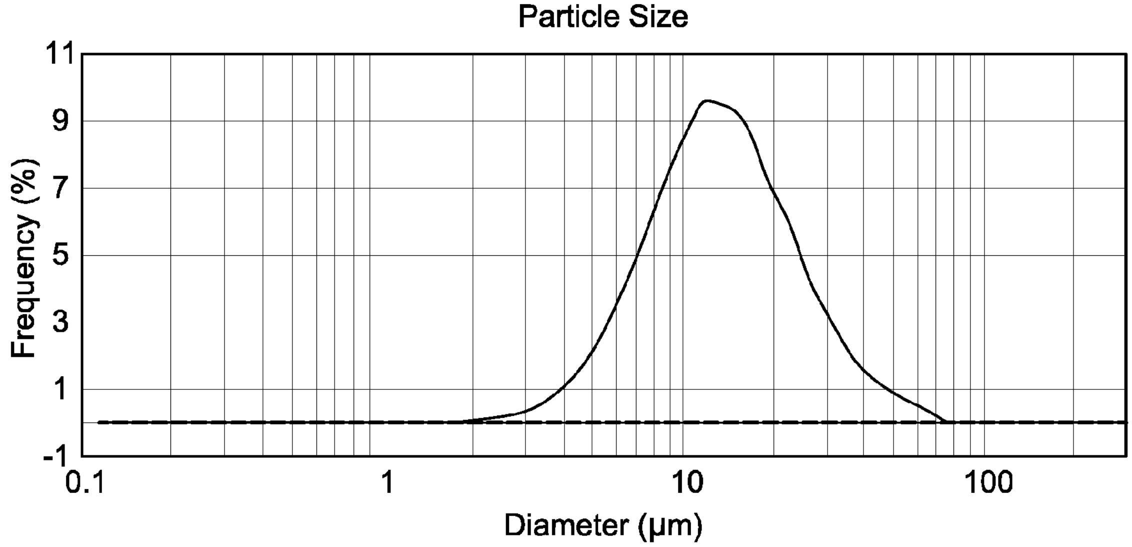
FIG. 12 is the particle size distribution of slickwater only (solid curved line), slickwater plus isomerized olefin sulfonate (IOS) and a Guerbet C10 ethoxylated alcohol surfactant (dashed straight line), slickwater plus isomerized olefin sulfonate (dashed straight line having the same frequency value and being coincident with the dashed straight line for the version with the Guerbet non-ionic surfactant).

FIG. 12 shows the particle size measurement of the field slickwater only sample (solid line with average particle size around 13 μm); slickwater plus 0.075% Guerbet C10 ethoxylated alcohol and 0.075% C16-18 internal olefin sulfonate (non-ionic and anionic surfactant; indicating a particle size of the solution is less than the minimum measurement of the instrument of 0.1 μm diameter); and field slickwater plus 0.075% C16-18 internal olefin sulfonate (anionic surfactant; solid line straight through 0 μm indicating a particle size of the solution is less than the minimum measurement of 0.1 μm diameter). Both slickwater plus anionic surfactant mixture and slickwater plus anionic-nonionic surfactant mixture resulted in a particle size measurements of at least less than 0.1 μm.

Example 3

A field example was performed in five horizontal wells in a North American unconventional subterranean formation. The wells had previously been fractured and had been producing 6-12 months. A low particle size injection fluid was injected into four horizontal wells and an aqueous based injection fluid was injected into the fifth horizontal well (i.e., the fifth well was merely used as a comparison well and did not utilize the low particle size injection fluid). The aqueous based injection fluid comprised a brine having ~5,000 ppm total dissolved solids (no fracturing fluids were used with the exception of a liquid additive biocide). The low particle size injection fluid was formed by combining a single-phase liquid surfactant package with the aqueous based injection fluid using the surface facility setup illustrated in FIG. 3B. Injection was performed at low flow rates over several days in an attempt to not refracture any of the wells. No injectivity issues were observed for any of the wells during injection. After injection and a soak period, production was resumed.

Figure 14:
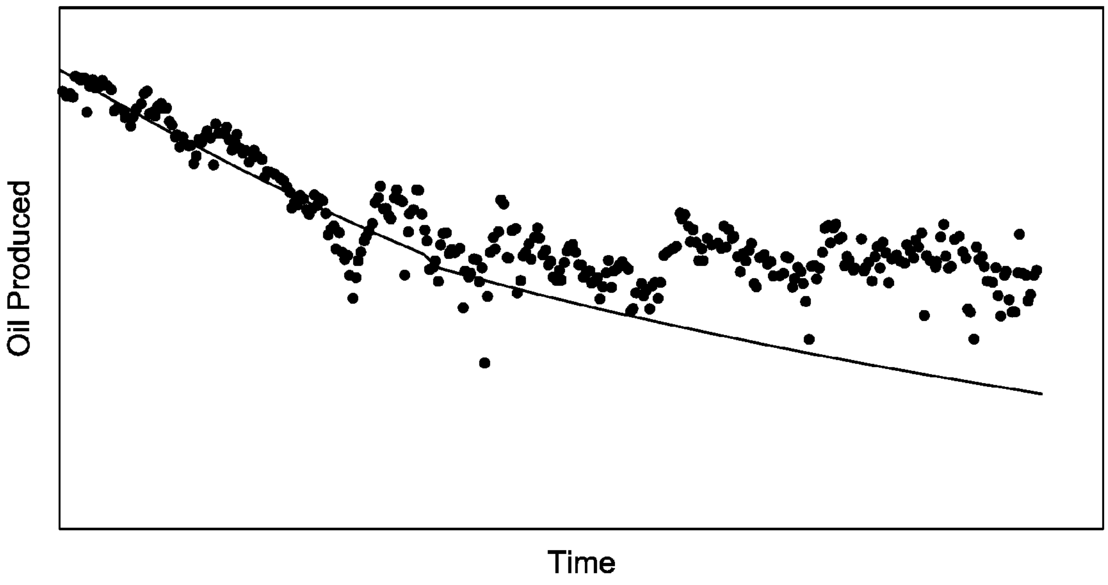
FIG. 14 a graph of fluid production at a tank battery level, which encompasses five horizontal wells, four of which were stimulated using an example LPS injection fluid. The dots represent crude oil flow production and the solid line represents a decline curve extrapolation fit that was performed for the tank battery prior to injection of the LPS injection fluid.

FIG. 14 provides a graph of fluid production at a tank battery level, which encompasses the five horizontal wells in this example. The dots represent crude oil flow production and the solid line represents a decline curve extrapolation fit that was performed for the tank battery prior to injection in this example. No new wells were added to the tank battery during the duration of this example and it is believed that the incremental oil recovered (represented by the area between the dots and the decline curve extrapolation) is a result primarily from the LPS fluid injected. The comparison well with only brine injection showed an initial uptick in oil production, but the oil production rate began declining back to what appeared to be the well's original decline curve. Whereas, the four wells injected with the LPS injection fluid showed sustained increases in oil production over the course of observation.

Figure 15:
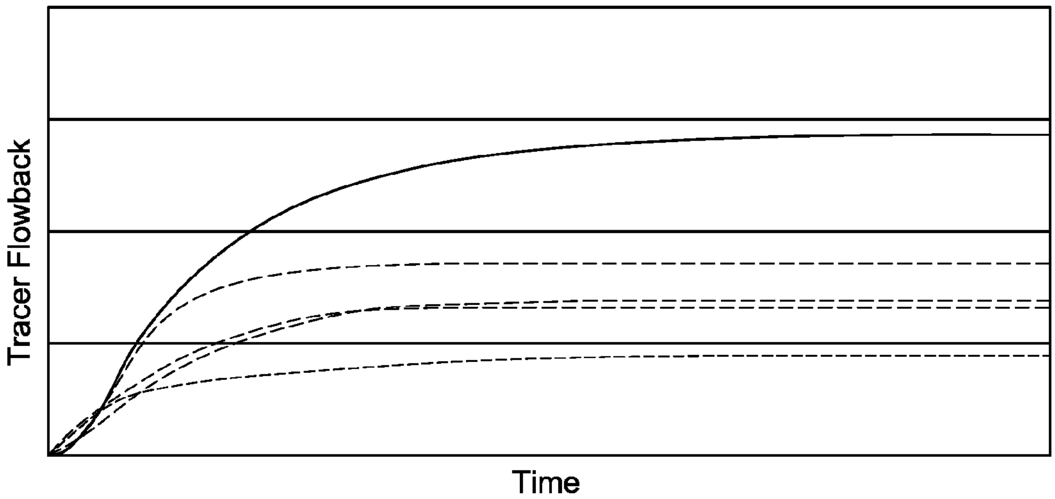
FIG. 15 shows tracer response curves for five horizontal wells, four of which were stimulated using an example LPS injection fluid. Injection fluid for each well was traced with a different chemical tracer in efforts to diagnose and interpret fluid production results. Tracer concentrations were measured from produced fluid samples. The quantity of tracer chemicals recovered compared to the total quantity injected for the comparison well with brine injection was much higher compared to the four wells injected with LPS fluid.

FIG. 15 shows tracer response curves for the five wells in this example. The comparison well with brine injection is shown in solid line and the LPS injected wells are shown in dashed lines. Injection fluid for each well was traced with a different chemical tracer in efforts to diagnose and interpret fluid production results. Tracer concentrations were measured from produced fluid samples. The quantity of tracer chemicals recovered compared to the total quantity injected for the comparison well with brine injection was much higher compared to the four wells injected with LPS fluid. It is believed that there was less tracer recovered from the wells injected with LPS fluids as they had a lower interfacial tension (IFT) compared to brine allowing them to imbibe further into the rock matrix of the unconventional subterranean reservoir and they were also able to alter the rock wettability to a more water-wet state, thus displacing additional crude oil from regions within the formation to the fractures.

The description and illustration of one or more embodiments provided in this application are not intended to limit or restrict the scope of the invention as claimed in any way. The embodiments, examples, and details provided in this disclosure are considered sufficient to convey possession and enable others to make and use the best mode of the claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope. For instance, such other examples are intended to be within the scope of the claims if they have structural or methodological elements that do not differ from the literal language of the claims, or if they include equivalent structural or methodological elements with insubstantial differences from the literal language of the claims, etc. All citations referred to herein are expressly incorporated by reference.

What is claimed is:

1. A method for stimulating an unconventional subterranean formation with a fluid, comprising:

(a) introducing a low particle size injection fluid through a wellbore into the unconventional subterranean formation, the low particle size injection fluid comprising an aqueous-based injection fluid and a single-phase liquid surfactant package comprising an anionic surfactant comprising a C10-C16 disulfonate, wherein the low particle size injection fluid is aqueous stable and has a maximum particle size of less than 0.1 micrometers in diameter in particle size distribution measurements performed at a temperature and salinity of the unconventional subterranean formation;

(b) allowing the low particle size injection fluid to imbibe into a rock matrix of the unconventional subterranean formation for a period of time; and (c) producing fluids from the unconventional subterranean formation through the wellbore.

2. The method of claim 1, wherein the anionic surfactant further comprises a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof.

3. The method of claim 1, wherein the anionic surfactant further comprises:

a branched or unbranched C6-C32:PO(0-65):EO(0-100)-carboxylate;

a surfactant defined by the formula below $$R^1—R^2—R^3$$

wherein $R^1$ comprises a branched or unbranched, saturated or unsaturated, cyclic or non-cyclic, hydrophobic carbon chain having 6-32 carbon atoms and an oxygen atom linking $R^1$ and $R^2$;

$R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups;

a C10-C30 internal olefin sulfonate;

a C8-C30 alkyl benzene sulfonate (ABS);

a sulfosuccinate surfactant;

a surfactant defined by the formula below

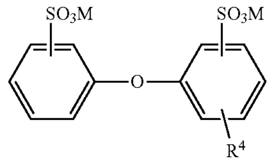

wherein $R^4$ is a branched or unbranched, saturated or unsaturated, cyclic or non-cyclic, hydrophobic carbon chain having 6-32 carbon atoms; and M represents a counterion;

or any combination thereof.

4. The method of claim 1, wherein the anionic surfactant has a concentration within the low particle size injection fluid of less than 1%, based on the total weight of the low particle size injection fluid.

5. The method of claim 1, wherein the low particle size injection fluid further comprises one or more secondary surfactants, and wherein the one or more secondary surfactants comprise one or more non-ionic surfactants, one or more anionic surfactants, one or more cationic surfactants, one or more zwitterionic surfactants, or any combination thereof.

6. The method of claim 5, wherein the one or more secondary surfactants comprise a non-ionic surfactant.

7. The method of claim 5, wherein the one or more secondary surfactants comprise from 0.001% to 2.5% by weight based on the total weight of the low particle size injection fluid.

8. A method for stimulating an unconventional subterranean formation with a fluid, comprising:

(a) introducing a low particle size injection fluid through a wellbore into the unconventional subterranean formation, the low particle size injection fluid comprising an aqueous-based injection fluid and a single-phase liquid surfactant package comprising a non-ionic surfactant comprising a branched or unbranched a C6-C30:PO(30-40):EO(25-35) surfactant, wherein the low particle size injection fluid is aqueous stable and has a maximum particle size of less than 0.1 micrometers in diameter in particle size distribution measurements performed at a temperature and salinity of the unconventional subterranean formation;

(b) allowing the low particle size injection fluid to imbibe into a rock matrix of the unconventional subterranean formation for a period of time; and (c) producing fluids from the unconventional subterranean formation through the wellbore.

9. The method of claim 1, wherein the low particle size injection fluid further comprises a friction reducer, a gelling agent, a crosslinker, a breaker, a pH adjusting agent, a non-emulsifier agent, an iron control agent, a corrosion inhibitor, a scale inhibitor, a biocide, a clay stabilizing agent, a proppant, a wettability alteration chemical, a co-solvent, or any combination thereof.

10. The method of claim 1, wherein the low particle size injection fluid has a total surfactant concentration of from 0.2% to 5% by weight, based on the total weight of the low particle size injection fluid.

11. The method of claim 1, wherein the low particle size injection fluid is introduced at a wellhead pressure of from 0 PSI to 30,000 PSI.

12. The method of claim 1, wherein the unconventional subterranean formation has a temperature of from 75° F. to 350° F.

13. The method of claim 1, wherein the unconventional subterranean formation has a salinity of at least 5,000 ppm TDS.

14. The method of claim 1, wherein the method further comprises ceasing introduction of the low particle size injection fluid through the wellbore into the unconventional subterranean formation before allowing step (b).

15. The method of claim 1, wherein the period of time is from one day to six months.

16. The method of claim 1, wherein method comprises stimulating a naturally fractured region of the unconventional subterranean formation proximate to a new wellbore, stimulating a naturally fractured region of the unconventional subterranean formation proximate to an existing wellbore, stimulating a previously fractured or previously refractured region of the unconventional subterranean formation proximate to a new wellbore, stimulating a previously fractured or previously refractured region of the unconventional subterranean formation proximate to an existing wellbore, or any combination thereof.

17. The method of claim 1, wherein the unconventional subterranean formation comprises naturally fractured carbonate.

18. The method of claim 1, wherein the unconventional subterranean formation comprises naturally fractured sandstone.

19. The method of claim 1, wherein the fluids comprise a hydrocarbon.

20. The method of claim 13, wherein the unconventional subterranean formation has a salinity of from 5,000 ppm TDS to 300,000 ppm TDS.

* * * * *